(12) United States Patent
Chaturvedi et al.

(10) Patent No.: US 8,020,147 B2
(45) Date of Patent: Sep. 13, 2011

(54) SOFTWARE PACKAGE IMPLEMENTATION SIZING

(75) Inventors: Atul Chaturvedi, Hyderabad (IN); Rajeev Ranjan, Bangalore (IN); RamPrasad Vadde, Hyderabad (IN)

(73) Assignee: Infosys Limited, Bangalore (IN)

( * ) Notice: Subject to any disclaimer, the term of this patent is extended or adjusted under 35 U.S.C. 154(b) by 1005 days.

(21) Appl. No.: 11/871,549

(22) Filed: Oct. 12, 2007

(65) Prior Publication Data

US 2009/0100404 A1  Apr. 16, 2009

(51) Int. Cl.
G06F 9/44 (2006.01)
(52) U.S. Cl. ........ 717/120; 717/100; 717/121; 717/151; 717/152
(58) Field of Classification Search .................. None
See application file for complete search history.

(56) References Cited

U.S. PATENT DOCUMENTS

| | | | | |
|---|---|---|---|---|
| 5,321,610 A * | 6/1994 | Breslin | | 705/7.17 |
| 5,428,729 A * | 6/1995 | Chang et al. | | 715/751 |
| 6,345,243 B1 * | 2/2002 | Clark | | 704/2 |
| 7,007,270 B2 * | 2/2006 | Martin et al. | | 717/131 |
| 7,599,870 B2 * | 10/2009 | Merkoulovitch et al. | | 705/36 R |
| 7,747,422 B1 * | 6/2010 | Sisley | | 703/13 |
| 7,765,519 B2 * | 7/2010 | Lunawat | | 717/100 |
| 7,784,024 B2 * | 8/2010 | Takashima et al. | | 717/106 |
| 2002/0052908 A1 * | 5/2002 | Cho et al. | | 709/102 |
| 2002/0166112 A1 * | 11/2002 | Martin et al. | | 717/124 |
| 2003/0233383 A1 * | 12/2003 | Koskimies | | 707/204 |
| 2004/0093589 A1 * | 5/2004 | Master | | 717/136 |
| 2004/0148586 A1 * | 7/2004 | Gilboa | | 717/108 |
| 2005/0166178 A1 * | 7/2005 | Masticola et al. | | 717/104 |
| 2007/0168910 A1 * | 7/2007 | Radford et al. | | 717/101 |
| 2007/0168912 A1 * | 7/2007 | Takashima et al. | | 717/101 |
| 2008/0082957 A1 * | 4/2008 | Pietschker et al. | | 717/101 |
| 2008/0092120 A1 * | 4/2008 | Udupa et al. | | 717/124 |
| 2008/0148225 A1 * | 6/2008 | Sarkar et al. | | 717/107 |

OTHER PUBLICATIONS

Title: Software size estimation of object-oriented systems, author: Laranjeira, L.A, dated Aug. 6, 2002, source: IEEE.*
Title: Class point: an approach for the size estimation of object-oriented systems, dated: Feb. 14, 2005, author: Costagliola et al, source: IEEE.*
Title: A validation of the component-based method for software size estimation, author: Dolado J.J source: IEEE, dated: Aug. 6, 2002.*
Title: Software size estimation of object-oriented systems , author: Laranjeira, L.A, source: IEEE, dated: Aug. 6, 2002.*

(Continued)

Primary Examiner — Chameli Das
(74) Attorney, Agent, or Firm — Klarquist Sparkman, LLP

(57) ABSTRACT

Implementation size of a software package implementation can be determined by determining implementation sizes of modules, determining tasks to be implemented, determining a complexity factor, and calculating the implementation size based on the modules, tasks, and complexity factor. Implementation size of a software package implementation can be determined using a sizing framework. The sizing framework can comprise a repository of modules and functionality provided by the modules, a standard album of tasks, effort information for the tasks, and a repository of complexity values. A sizing tool can determine an implementation size of a software package implementation. The sizing tool can comprise user-interface pages for receiving a selection of modules, for receiving a selection of functionality, for receiving a selection of tasks to be implemented for the software package, and for receiving a selection of complexity values. The sizing tool can calculate the implementation size based on the selections.

15 Claims, 30 Drawing Sheets

OTHER PUBLICATIONS

Parthasarathy M.A., "Estimation Practices—Understanding Software 'Size'," <http://www.infosys.com/services/application-development-maintenance/white-papers/Infosys-software-project-estimation-practices.pdf>, 10 pages (Jan. 2006).

Damodaran, "Estimation Using Use Case Points," <http://www.bfpug.com.br/Artigos/UCP/Damodaran-Estimation_Using_Use_Case_Points.pdf>, 4 pages (2002).

Wikipedia, "Function point," <http://en.wikipedia.org/wiki/Function_point>, 3 pages (accessed Jul. 9, 2007).

* cited by examiner

FIG. 5
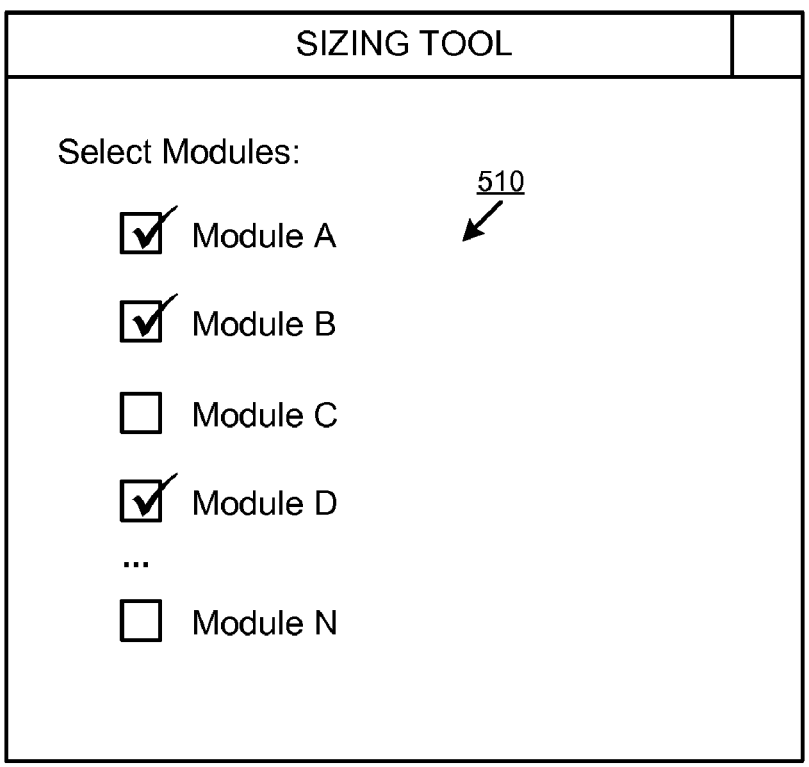

FIG. 10

Arriving at Package Points ....

☐ The % Usage for a certain module to be implemented would be sum of the fixed portions and Variable portions of the selected tasks.

% Usage for a Task (connotes % of Size for One Complete Standard Package Implementation) = Module Size * % Std Usage for Variable portion of Task + Module Size * % Std Usage for Fixed portion of Task

= Module Size * $A*(CF)^2 + B$ + $M*(CF)^2 + C$

A, B, M and C are constants specific to the Tasks Selected

Package Points = $100 * \sum$ % Usage for all Selected Tasks in the project

Package Points Connotes the Size of Package Implementation as a percentage of size for one Standard Package Implementation (i.e percentage of size for a package with One standard Module having least Complexity and with all tasks of Standard Album in scope).

Example: 6780 Package Points indicates 67.80% of the Size of a Standard Package Implementation

FIG. 11B

Step 1 - Define Project and Select Application

1. User should enter Proposal / Project Name in top left block of the form.
2. Select Application in the top right block of the form Step 2 - Select and Add Module 3. User should select the module from the drop down

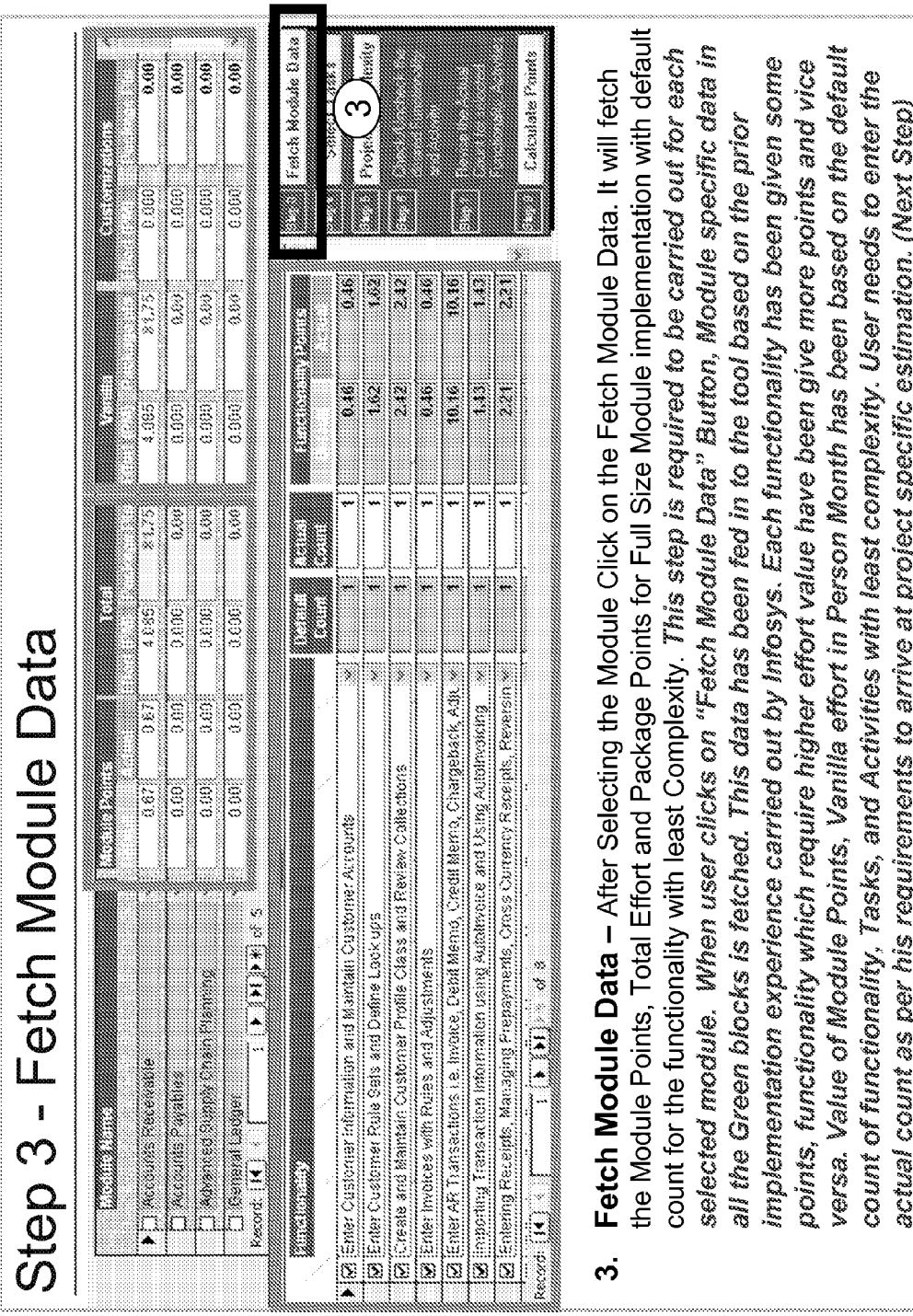

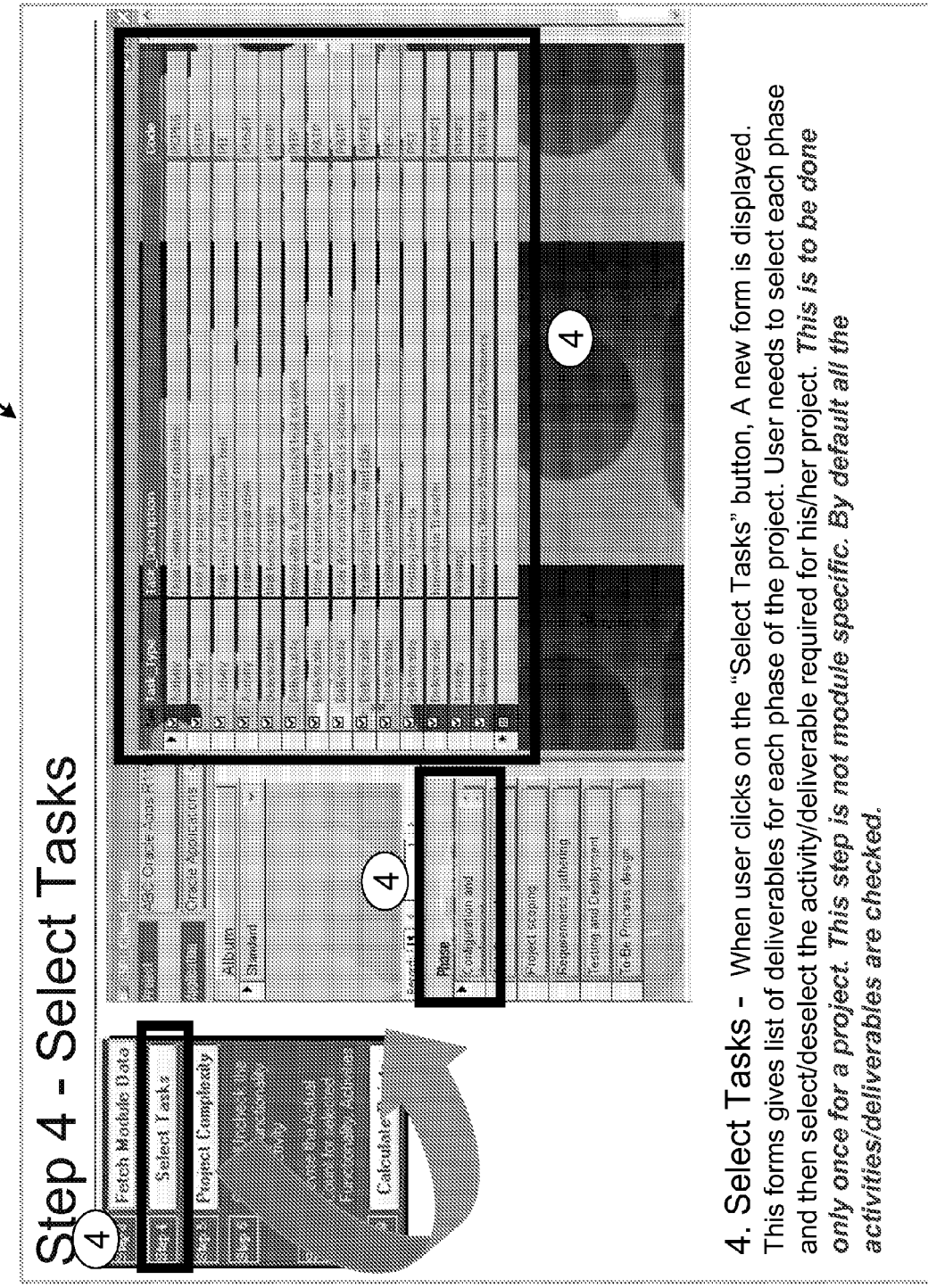

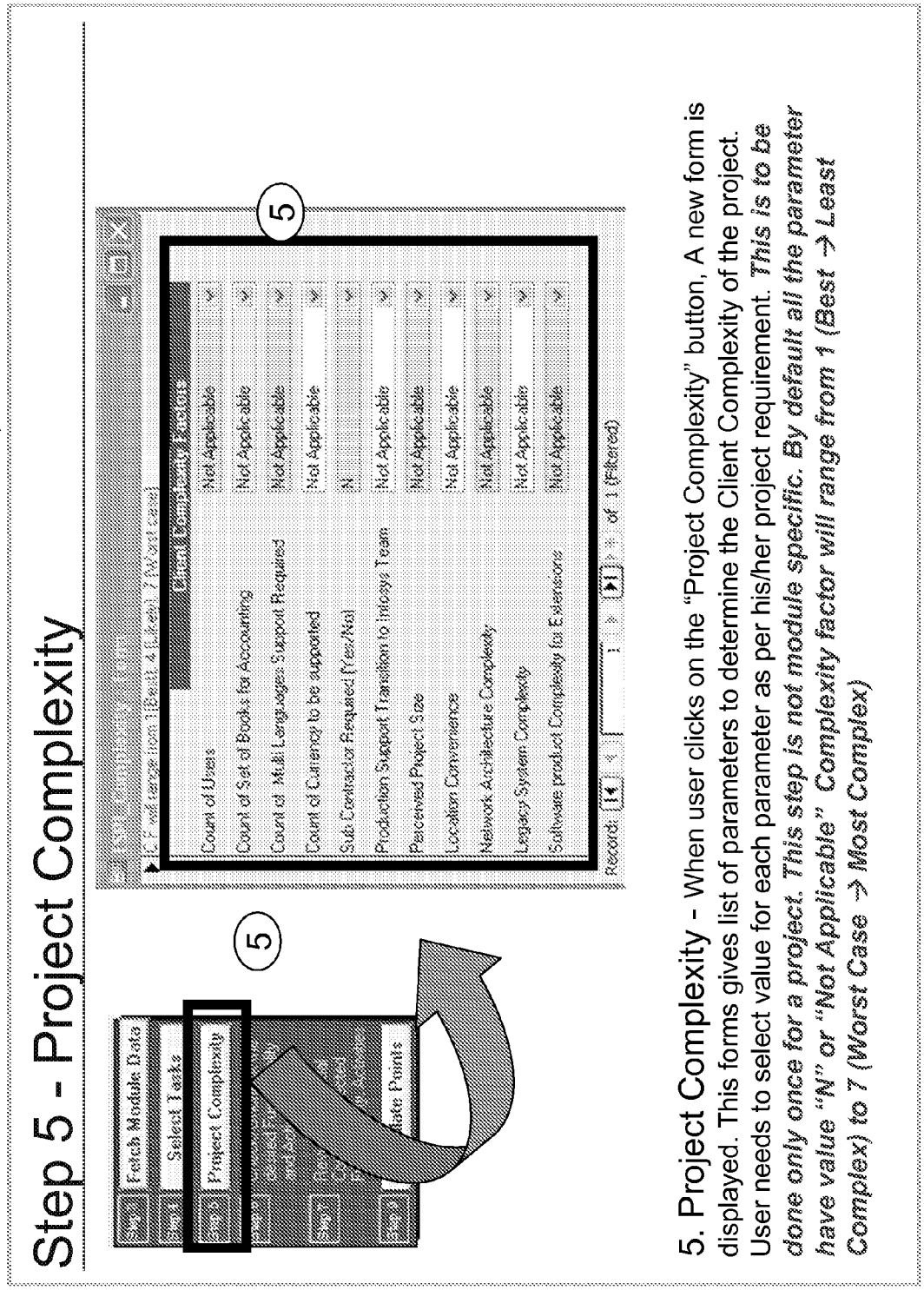

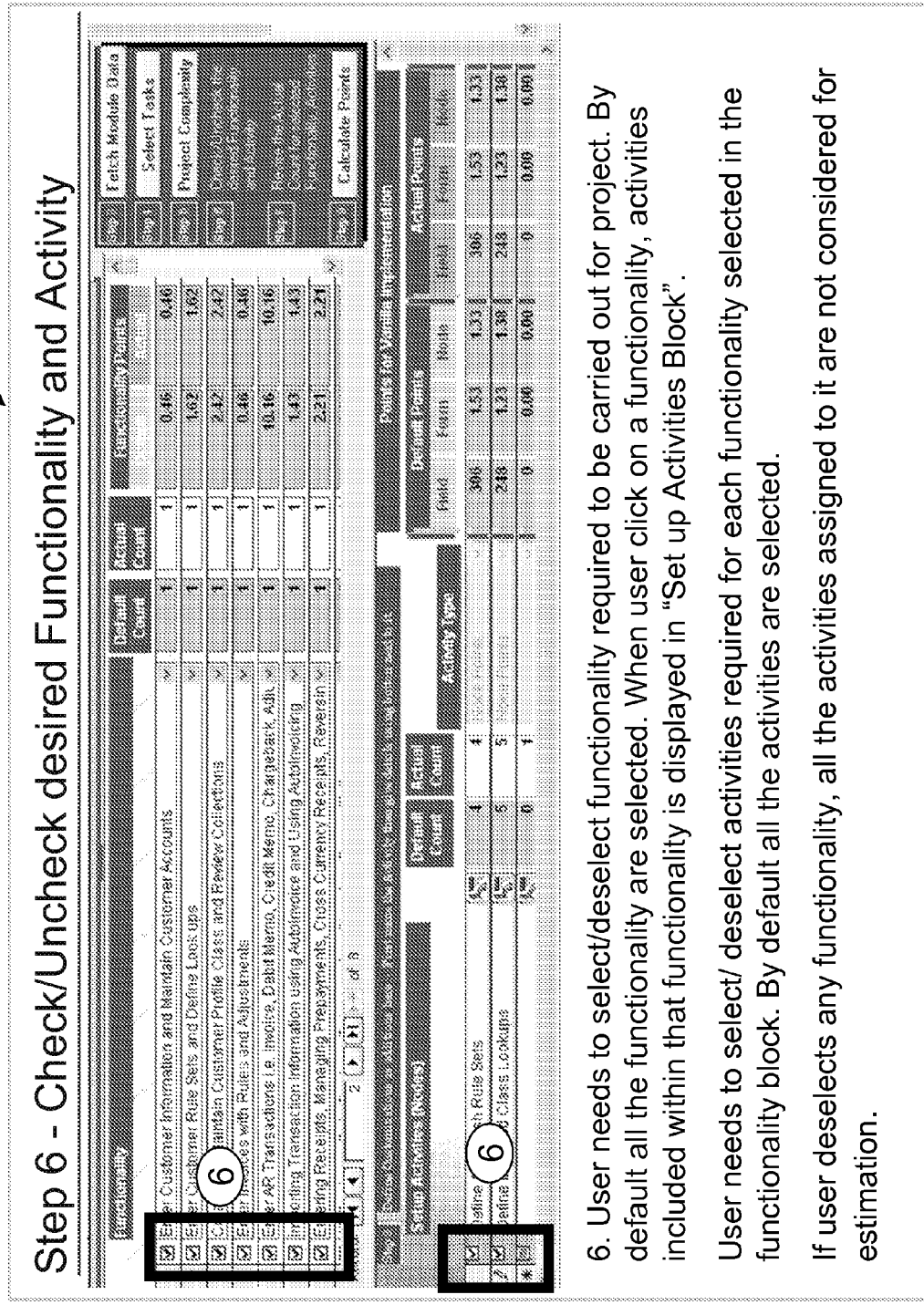

FIG. 11H

Step 7 - Revise the actual count for selected Functionality and activities

7. User needs to revise actual count for selected functionality and activities selected. Default package points are calculated based on the default count of functionality and activities considered while design of the tool.

User needs to revise the actual count of these functionality and activities to arrive at the estimate. *Values of default count are defaulted on the actual count column at the time of form opening.*

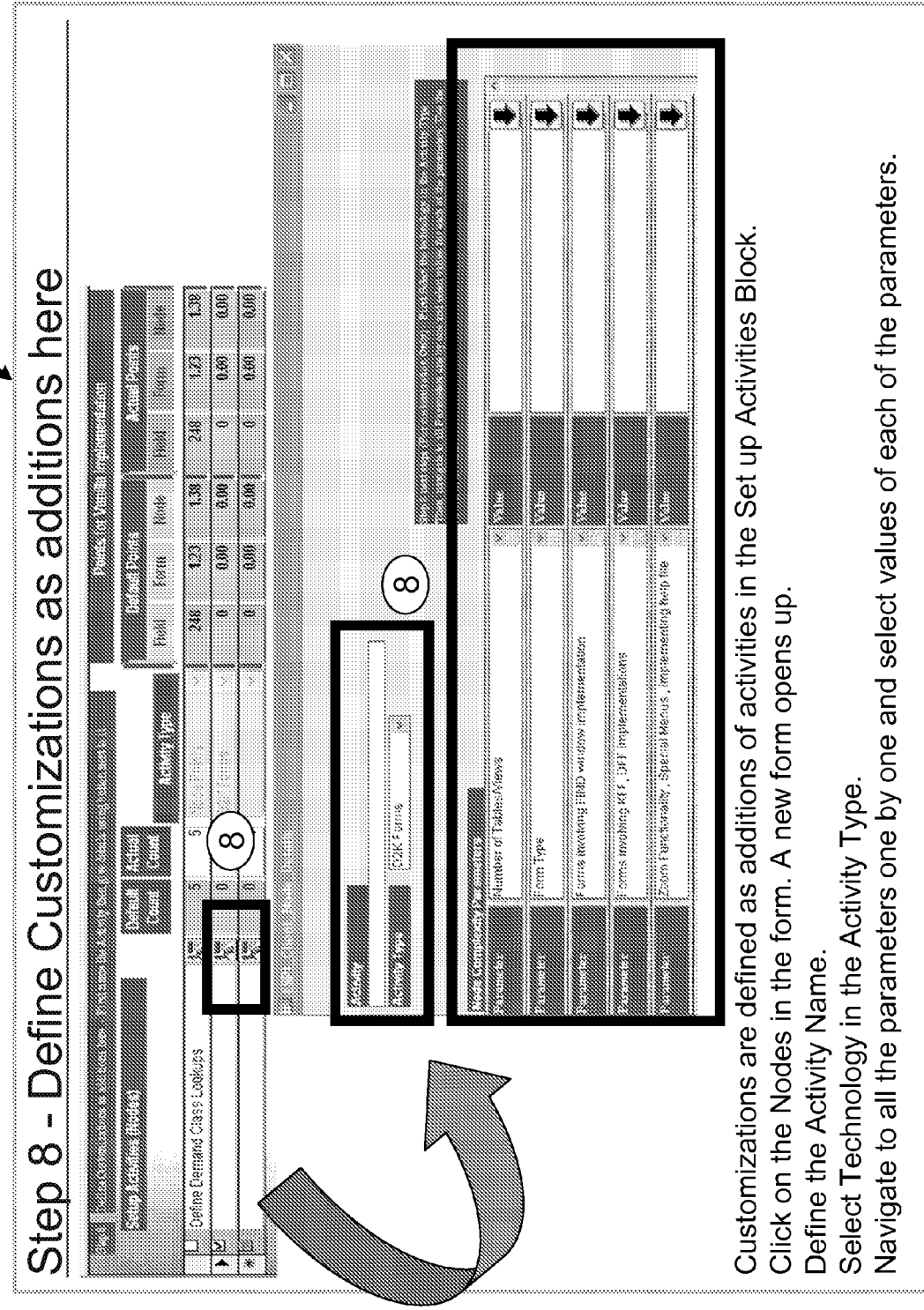

Step 9 - Calculate Points

9. Click on the Calculate Points button. Tool will calculate the package points and effort (in person month) required to implement the modules.

FIG. 12A

Data entered by the user:

Name Of the Project: [ Test Project ]

Applications: [ Oracle Applications ]

Solutionv(Modules, Processes and Setups/Nodes) that are being Implemented as part of the Project

Modules

Accounts Receivable

*Processes*

Enter Customer Information and Maintain Customer Accounts

| Default Count: | 1 | Actual Count | 1 |
|---|---|---|---|
| Type | Regular | Criticality | High |
| Data Handling | Front End Creation | Interaction | Cross Module |
| Data Impact | Multiple Record | Mode | Front End |

Enter Customer Rule Sets and Define Look ups

| Default Count | 1 | Actual count | 1 |
|---|---|---|---|
| Type | Regular | Criticality | Very High |
| Data Handling | Front End Creation | Interaction | Cross Module |
| Data Impact | Multiple Record | Mode | Front End |

*Setups / Nodes*

Define Remit To Addresses

| Default Count | 3 | Actual Count | 3 |
|---|---|---|---|
| Setup Level | Process | Discussion Level | Medium |

Define Profile Classes

| Default Count | 5 | Actual Count | 5 |
|---|---|---|---|
| Setup Level | Null | Discussion Level | Null |

Define AutoCash Rule Sets

| Default Count | 4 | Actual Count | 4 |
|---|---|---|---|
| Setup Level | Process | Discussion Level | Medium |

Define Demand Class Lookups

| Default Count | 5 | Actual Count | 5 |
|---|---|---|---|
| Setup Level | Process | Discussion Level | Medium |

Accounts Payable

Payables Setup

| Default Count: | 1 | Actual Count | 2 |
|---|---|---|---|
| Type | Regular | Criticality | High |
| Data Handling | Front End Creation | Interaction | Cross Process |
| Data Impact | Single Record | Mode | Front End |

Select Primary Set of Books

| Default Count | 1 | Actual Count | 1 |
|---|---|---|---|
| Setup Level | Org | Discussion Level | Low |

Define Financial Options

| Default Count | 1 | Actual Count | 1 |
|---|---|---|---|
| Setup Level | Org | Discussion Level | Medium |

Define Payables Options

| Default Count | 1 | Actual Count | 2 |
|---|---|---|---|
| Setup Level | Org | Discussion Level | Medium |

Tasks that are being performed as part of the Implementation Project

1200B

| Album | Phases | Tasks |
|---|---|---|
| Standard | Configuration and development | Final Configuration of modules |
| | Cut-Over and support | Go-live readiness assessment |
| | Project scoping | Project Plan & Estimates |
| | Requirements gathering | Initiation, Introductions & Admin |
| | Testing and Deployment | Perform data migrations |
| | To-Be Process design | Demo of Oracle Apps modules |

Complexity Values for the Project

| | |
|---|---|
| Count Of Users | Few Less than 100 |
| Count of Set of Books for Accounting | Few Less than or equal to 2 |
| Count of Multi Languages Support Required | Few Less than or equal to 2 |
| Count of Currency to be supported | Few Less than or equal to 2 |
| Sub Contractor Required (Yes/No) | Y |
| Production Support Transition to Infosys Team | Y |
| Perceived Project Size | Very Small |
| Location Convenience | Convenient |
| Network Architecture Complexity | Very Simple |
| Legacy System Complexity | Very Simple |
| Software Productivity Complexity for Extensions | Upto 4 Days for Training |

FIG. 12C

Calculate Field Points

Default and Actual Field Points

Standard Default Value of Fields required for all nodes/setups is maintained in the Tool Database.

The Default Field Points for the selected Nodes are calculated by multiplying the standard field values with Default Node Count maintained for each Node in the Database The Actual Field Points for the selected Nodes are calculated by multiplying the standard field values with Actual Node Count selected by user

| Nodes | Standard Default Value of Fields | Default Field Points | | Actual Field Points | |
|---|---|---|---|---|---|
| | | Default Node Count | Default Field Points | Actual Node Count | Actual Field Points |
| Define Remit To Addresses | 49.5 | 3 | 148.5 | 3 | 148.5 |
| Define Profile Classes | 180 | 5 | 900 | 5 | 900 |
| Define AutoCash Rule Sets | 76.5 | 4 | 306 | 4 | 306 |
| Define Demand Class Lookups | 49.5 | 5 | 247.5 | 5 | 247.5 |
| Select Your Primary Set of Books | 18 | 1 | 18 | 1 | 18 |
| Define Financial Options | 190.12 | 1 | 190.12 | 1 | 190.12 |
| Define Payabale Options | 354.34 | 1 | 354.34 | 2 | 708.68 |

Graded Default and Actual Field Points

Tool provides functionality to grade number of points that are calculated at any level, based on the points at that level.
For example upto 1000 field points may either be considered as a fixed size or a grading factor can be applied to calculate graded points at that level. Whereas if the field point are over 1000, the fixed size or the factor may be different The grading factor - both fixed and variable are maintained in the Tool Database. Based on this, the Default and Actual Graded Points are calculated In this case all input field points between 0 and 99999 have been setup with Grading Factor (Graded Point Increment) 1

| Nodes | Grading Factor (for Default) | Graded Default Field Points | Grading Factor (actual) | Graded Actual Field Points |
|---|---|---|---|---|
| Define Remit To Addresses | 1 | 148.5 | 1 | 148.5 |
| Define Profile Classes | 1 | 900 | 1 | 900 |
| Define AutoCash Rule Sets | 1 | 306 | 1 | 306 |
| Define Demand Class Lookups | 1 | 247.5 | 1 | 247.5 |
| Select Your Primary Set of Books | 1 | 18 | 1 | 18 |
| Define Financial Options | 1 | 190.12 | 1 | 190.12 |
| Define Payabale Options | 1 | 354.34 | 1 | 708.68 |

Calculate Form Points

*Default and Actual Form Points*
Default Form Points is equal to the Default Graded Field Points for all the fields in the form
Actual Form Points is equal to the Actual Graded Field Points for all the fields in the form

| Nodes | Default Form Points | Actual Form Points |
|---|---|---|
| Define Remit To Addresses | 148.5 | 148.5 |
| Define Profile Classes | 900 | 900 |
| Define AutoCash Rule Sets | 306 | 306 |
| Define Demand Class Lookups | 247.5 | 247.5 |
| Select Your Primary Set of Books | 18 | 18 |
| Define Financial Options | 190.12 | 190.12 |
| Define Payabale Options | 354.34 | 708.68 |

*Graded Default and Actual Form Points*
Grading at the form level is also calculated as explained for the Field Grading.
In this case, all input points between 0 to 1000 are graded by a factor of 200. Over 1,000, they are graded at 180.
Since Default and Actual Form Points are less than 1000, a factor of 200 is applied for grading to result in the following

| Nodes | Grading Factor (for Default) | Graded Default Form Points | Grading Factor (Actual) | Graded Actual Form Points |
|---|---|---|---|---|
| Define Remit To Addresses | 200 | 0.74 | 200 | 0.74 |
| Define Profile Classes | 200 | 4.50 | 200 | 4.50 |
| Define AutoCash Rule Sets | 200 | 1.53 | 200 | 1.53 |
| Define Demand Class Lookups | 200 | 1.24 | 200 | 1.24 |
| Select Your Primary Set of Books | 200 | 0.09 | 200 | 0.09 |
| Define Financial Options | 200 | 0.95 | 200 | 0.95 |
| Define Payabale Options | 200 | 1.77 | 200 | 3.54 |

Calculate Node Points

Default and Actual Node Points
Each Node has two Parameters (Setup Level and Discussion Level) and each parameter has a given set of values
An Input Modifier Weightage for the Parameter and Parameter Value selected is maintained in the Tool Database
Node points are calculated based on the Graded Form Points and the Modifiers

1200E

| Nodes | Parameter Type Modifier | | Parameter Value Modifier | | Cumulative Modifier | Default Node Points |
|---|---|---|---|---|---|---|
| Define Remit To Addresses | Setup Level | 0.5 | Process | 1.25 | 1.13 | 0.84 |
| | Discussion Level | 0.5 | Medium | 1 | | |
| Define Profile Classes | Setup Level | 0 | | | 0.00 | 0.00 |
| | Discussion Level | 0 | | | | |
| Define AutoCash Rule Sets | Setup Level | 0.5 | Process | 1.25 | 0.88 | 1.34 |
| | Discussion Level | 0.5 | Low | 0.5 | | |
| Define Demand Class Lookups | Setup Level | 0.5 | Process | 1.25 | 1.13 | 1.39 |
| | Discussion Level | 0.5 | Medium | 1 | | |
| Select Your Primary Set of Books | Setup Level | 0.5 | Process | 1.25 | 1.13 | 0.10 |
| | Discussion Level | 0.5 | Medium | 1 | | |
| Define Financial Options | Setup Level | 0.5 | Organization | 1.75 | 1.38 | 1.31 |
| | Discussion Level | 0.5 | Medium | 1 | | |
| Define Payable Options | Setup Level | 0.5 | Organization | 1.75 | 1.38 | 2.44 |
| | Discussion Level | 0.5 | Medium | 1 | | |

Graded Default and Actual Node Points
Grading at the Node level is also calculated as explained for the Field Grading
In this case, all input points between 0 to 99999 are graded by a factor of 1.

| Nodes | Grading Factor (Default) | Graded Default Node Points | Grading Factor (Acutal) | Graded Actual Node Points |
|---|---|---|---|---|
| Define Remit To Addresses | 1 | 0.84 | 1.00 | 0.84 |
| Define Profile Classes | 1 | 0.00 | 1.00 | 0.00 |
| Define AutoCash Rule Sets | 1 | 1.34 | 1.00 | 1.34 |
| Define Demand Class Lookups | 1 | 1.39 | 1.00 | 1.39 |
| Select Your Primary Set of Books | 1 | 0.10 | 1.00 | 0.10 |
| Define Financial Options | 1 | 1.31 | 1.00 | 1.31 |
| Define Payabale Options | 1 | 2.44 | 1.00 | 4.87 |

FIG. 12F

Calculate Process Points

Default and Actual Process Points
Each Process has six Parameters (Type, Criticality, Data Handling, Interaction, Data Impact, Mode) and each parameter has a given set of values.
An Input Modifier Weightage for the Parameter and Parameter Value selected is maintained in the Tool Database
Process points are calculated based on the Graded Node Points and the Modifiers

| Processes | Parameter Type Modifier | | Parameter Value Modifier | | Cumulative Modifier | Default Process Points | Actual Process Points |
|---|---|---|---|---|---|---|---|
| | Type | 0.22 | Regular | 1 | | | |
| | Criticality | 0.23 | High | 1.75 | | | |
| Enter Customer Information and Maintain Customer Accounts | Data Handling | 0.16 | Front End Creation | 1 | 1.47 | 1.23 | 1.23 |
| | Interaction | 0.21 | Cross Module | 2.25 | | | |
| | Data Impact | 0.08 | Multiple Record | 1.87 | | | |
| | Mode | 0.07 | Front End | 1 | | | |
| | Type | 0.22 | Regular | 1 | | | |
| | Criticality | 0.23 | Very High | 2.25 | | | |
| Enter Customer Rule Sets and Define Look ups | Data Handling | 0.16 | Front End Creation | 1 | 1.59 | 4.34 | 4.34 |
| | Interaction | 0.21 | Cross Module | 2.25 | | | |
| | Data Impact | 0.08 | Multiple Record | 1.87 | | | |
| | Mode | 0.07 | Front End | 1 | | | |
| | Type | 0.22 | Regular | 1 | | | |
| | Criticality | 0.23 | High | 1.75 | | | |
| Payables Setup | Data Handling | 0.16 | Front End Creation | 1 | 1.38 | 5.30 | 8.65 |
| | Interaction | 0.21 | Cross Process | 2.12 | | | |
| | Data Impact | 0.08 | Single Record | 1 | | | |
| | Mode | 0.07 | Front End | 1 | | | |

Graded Default and Actual Process Points
Grading at the Process level is also calculated as explained for the Field Grading
In this case, all input points between 0 to 15 are graded by a factor of 2.64 and between 15 and 99999 is graded at 2.45.

| Processes | Grading Factor (Default) | Graded Default Process Points | Grading Factor (Actual) | Graded Actual Process Points |
|---|---|---|---|---|
| Enter Customer Information and Maintain Customer Accounts | 2.64 | 0.47 | 2.64 | 0.47 |
| Enter Customer Rule Sets and Define Look ups | 2.64 | 1.64 | 2.64 | 1.64 |
| Payables Setup | 2.64 | 2.01 | 2.64 | 3.28 |

Calculate Module Points

_Default and Actual Module Points_
Default Module Points is equal to the sum of graded default process points for that module
Actual Module Points is equal to the sum of graded actual process points for that module

| Modules | Default Module Points | Actual Module Points |
|---|---|---|
| Accounts Receivable | 2.11 | 2.11 |
| Accounts Payable | 2.01 | 3.28 |

_Graded Default and Actual Module Points_
Grading at the Process level is also calculated as explained for the Field Grading.
In this case, all input points between 0 to 400 are graded by a factor of 37.8 and between 400 and 99999 is graded at 35

| Modules | Grading Factor (Default) | Graded Default Module Points | Grading Factor (Actual) | Graded Actual Module Points |
|---|---|---|---|---|
| Accounts Receivable | 37.80 | 0.06 | 37.80 | 0.06 |
| Accounts Payable | 37.80 | 0.05 | 37.80 | 0.09 |

Calculate CF (Complexity Factor) Points

Complexity Factor

| Parameter Type | Parameter Type Weightage | Parameter Value | Parameter Value Weightage | Weighted Average |
|---|---|---|---|---|
| Count Of Users | 0.1 | Few Less than 100 | 0.62 | 0.062 |
| Count of Set of Books for Accounting | 0.08 | Few Less than or equal to 2 | 0.62 | 0.0496 |
| Count of Multi Languages Support Required | 0.08 | Few Less than or equal to 2 | 0.62 | 0.0496 |
| Count of Currency to be supported | 0.08 | Few Less than or equal to 2 | 0.62 | 0.0496 |
| Sub Contractor Required (Yes/No) | 0.08 | Y | 1.625 | 0.13 |
| Production Support Transition to Infosys Team | 0.08 | Y | 1.75 | 0.14 |
| Perceived Project Size | 0.1 | Very Small | 0.5 | 0.05 |
| Location Convenience | 0.05 | Convenient | 1 | 0.05 |
| Network Architecture Complexity | 0.07 | Very Simple | 0.5 | 0.035 |
| Legacy System Complexity | 0.1 | Very Simple | 0.5 | 0.05 |
| Software Productivity Complexity for Extensions | 0.08 | Upto 4 Days for Training | 0.7 | 0.056 |
| Data Conversion Complexity | 0.1 | Very Simple | 0.5 | 0.05 |
|  |  |  | Total | 0.7718 |

Sum of CF Points _0.7718_

Graded Complexity Factor

Complexity Factor is graded based on Fixed values

| Minimum Complexity Factor | Maximum Complexity Factor | Graded Complexity Factor |
|---|---|---|
| 0 | 0.9 | 1 |
| 0.9 | 1.04 | 2 |
| 1.04 | 1.56 | 3 |
| 1.56 | 2.08 | 4 |
| 2.08 | 2.6 | 5 |
| 2.6 | 3.12 | 6 |
| 3.12 | 10 | 7 |

Based on the above, and since the Complexity Factor is 0.7718, the Graded Complexity Factor is 1

*Calculate Package Points*

*Calculate Points from Tasks*

Based on this Historical effort data, the different task effort could be expressed as a percentage of total effort for a Standard Package Implementation. This is called % Std Usage % Std Usage has a Fixed (not dependent on the Module Size) and a Variable Portion (dependent on Module Size).
Both Fixed and Variable % Std Usage are calculated for a specific Complexity Factor

| Task | Complexity Factor | Fixed % Std Usage (calculated for CF 1) | Variable % Std Usage (calculated for CF 1) | Module Size (Graded Actual) | | Actual Points for Tasks | |
|---|---|---|---|---|---|---|---|
| | | | | AR | AP | AR | AP |
| Final Configuration of modules | 1 | 0 | 2.13 | 0.06 | 0.09 | 0.1278 | 0.1917 |
| Go-live readiness assessment | 1 | 0.43 | 0 | 0.06 | 0.09 | 0.43 | 0.43 |
| Project Plan & Estimates | 1 | 2.13 | 0 | 0.06 | 0.09 | 2.13 | 2.13 |
| Initiation, Introductions & Admin | 1 | 0 | 1.28 | 0.06 | 0.09 | 0.0768 | 0.1152 |
| Perform data migrations | 1 | 0 | 1.28 | 0.06 | 0.09 | 0.0768 | 0.1152 |
| Demo of Oracle Apps modules | 1 | 0 | 0.85 | 0.06 | 0.09 | 0.051 | 0.0765 |
| *Vanilla Package Points (Actual)* | | | | | | 2.8924 | 3.0586 |

| Vanilla Package Points |
|---|
| 5.95 |

*Package Points*

NOTE: The reason for a small Vanilla Package Points of about 6 is because only two setups or so of each module have been considered for 6 activities only.

NOTE: Based on Package Points and Productivity, the Effort required in terms of man-months can be easily calculated. Sample is provided below with following assumptions 1. Productivity is 20 Package Points/Person Month
2. 22 Person days are considered in a Person Month

| | | Productivity | Person Months | Person Days |
|---|---|---|---|---|
| *Total Effort* | Package Points/ Productivity | 20 | 0.30 | 6.55 |

1200I

SOFTWARE PACKAGE IMPLEMENTATION SIZING

BACKGROUND

Accurately estimating the size of a software package implementation can be a difficult task. An inability to accurately estimate implementation size can result in significant time and cost overruns. Therefore, the ability to accurately estimate the size of a software package implementation can be essential to the success of a software package implementation project.

There are a number of solutions for estimating software size with regards to software development projects. For example, function points and lines of code are two methodologies used to measure the size of a software application. Function points and lines of code are useful in determining the size of a software application and thus the effort that will be required to develop the software application. However, because software package implementation projects involve little or no software development, function points and lines of code sizing methodologies can be ineffective in accurately sizing software package implementation projects.

Sizing a software package implementation project can be difficult due to the variety of activities involved. For example, implementing a software package can involve activities such as discovery, gap analysis, installation, configuration, testing, training, and deployment.

Therefore, there exists ample opportunity for improvement in technologies related to sizing software package implementations.

SUMMARY

A variety of technologies related to software package implementation sizing (e.g., determining a size of a software package implementation project) can be applied. For example, an implementation size of a software package implementation project can be determined (e.g., using a sizing framework). The implementation size of the software package implementation project can be determined by determining implementation sizes of one or more modules, determining one or more tasks to be implemented, determining a complexity factor, and calculating the implementation size of the software package implementation project based on the implementation sizes of the one or more modules, the one or more tasks to be implemented, and the complexity factor.

A sizing framework for determining an implementation size of a software package implementation project can be provided. For example, the sizing framework can comprise a repository of one or more modules of the software package and functionality provided by each of the one or more modules. The sizing framework can further comprise repositories for a standard album of tasks of the software project and effort information for each task of the standard album of tasks. The sizing framework can also comprise a repository of complexity values for corresponding complexity parameters. The sizing framework can be used for determining the implementation size of the software package implementation project based on the implementation size of one or more selected modules, one or more selected tasks, the effort information, and one or more complexity factors.

A sizing tool for determining an implementation size of a software package implementation project can be provided. For example, the sizing tool can comprise one or more user-interface pages for receiving a selection of one or more modules to be implemented for the software package, one or more user-interface pages for receiving a selection of functionality of the one or more selected modules, one or more user-interface pages for receiving a selection of one or more tasks to be implemented for the software package, and one or more user-interface pages for receiving a selection of one or more complexity values for one or more complexity factor parameters. The sizing tool can calculate the implementation size of the software package implementation project based on the one or more selected modules, the selected functionality of the one or more selected modules, the one or more selected tasks, and the one or more selected complexity values.

The effort required to implement a software package implementation project can be determined. For example, functionality to be implemented for one or more modules of the software package can be determined (e.g., the determining functionality can comprise selecting a plurality of parameter values for a corresponding plurality of level parameters). One or more tasks to be implemented for the software package implementation project can be determined (e.g., the determining the one or more tasks can comprise selecting the one or more tasks from a plurality of project phases). A complexity factor for the software package implementation project can be determined (e.g., determining the complexity factor can comprise selecting a plurality of complexity factor values for a corresponding plurality of complexity factor parameters). The effort required to implement the software package implementation project can be calculated based at least on the functionality to be implemented for one or more modules, the one or more tasks to be implemented, the complexity factor, and historical productivity data.

The foregoing and other features and advantages of the invention will become more apparent from the following detailed description, which proceeds with reference to the accompanying figures.

BRIEF DESCRIPTION OF THE DRAWINGS

FIG. 5 is a diagram showing an exemplary user interface for selecting modules.

FIG. 10 is a diagram showing example equations and calculations for determining an implementation size of a software package implementation project.

FIGS. 11A-11J are diagrams showing exemplary screenshots of a sizing tool.

FIGS. 12A-12I are diagrams showing exemplary software package implementation sizing.

DETAILED DESCRIPTION OF EXEMPLARY EMBODIMENTS

Example 1

Exemplary Software Package

Figure 1:
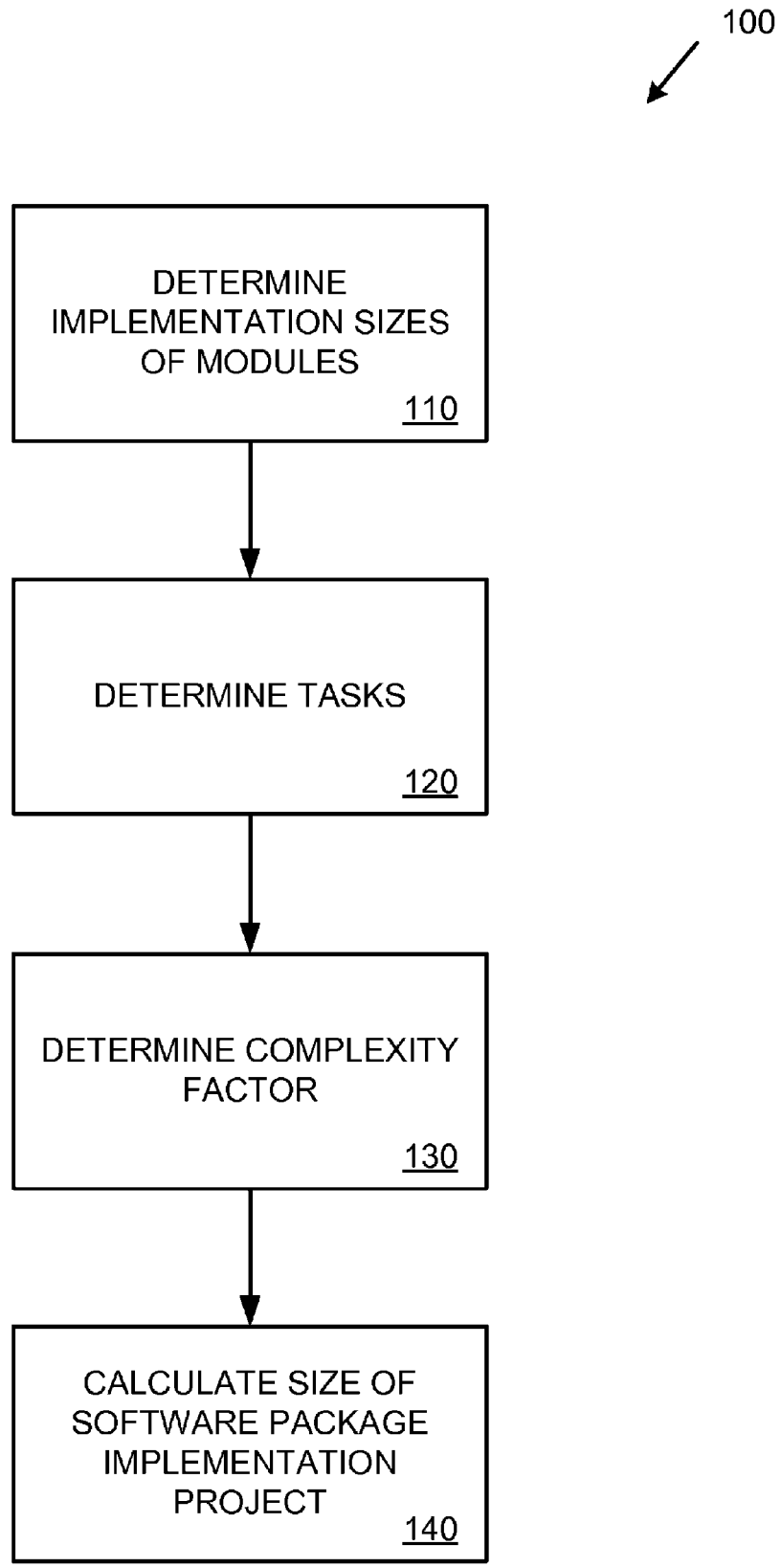
FIG. 1 is a flowchart showing an exemplary method for determining an implementation size of a software package implementation project.

In any of the examples herein, a software package can be one or more software applications, such as an Enterprise Resource Planning (ERP) software system. A software package can also be a component of a software application. A software package can include one or more modules.

An example of an ERP software system is Oracle Applications 11i (Oracle is a registered trademark of Oracle Corporation). Oracle Applications 11i includes modules such as general ledger, payables, receivables, etc.

Example 2

Exemplary Module

In any of the examples herein, a module can be a collection of functionality (e.g., related business processes) provided by a software package. For example, a module can be an accounts receivable module, an accounts payable module, a general ledger module, an inventory module, or the like.

Example 3

Exemplary Software Package Implementation

In any of the examples herein, a software package can be implemented. A software package can be implemented for a specific client or customer. Software package implementation can comprise a wide variety of tasks and activities, such as: discovery, gap analysis, installation, configuration, custom development, testing, and training.

Different activities related to software package implementation can be performed by different entities. For example, one entity may perform discovery and gap analysis and a different entity may perform installation and configuration.

Example 4

Exemplary Implementation Size of a Module

In any of the examples herein, the implementation size of a module refers to the functionality, processes, setup activities, forms, etc. that need to be implemented for the module for a specific situation (e.g., for a specific business). Implementation size of a module can be determined by evaluating characteristics of the module at various levels. For example, characteristics can be evaluated at field level, form level, setup level, and process level. Points can be calculated at each level and added (e.g., using a grading system) to determine an implementation size of the module in terms (e.g., units) of module points.

Example 5

Exemplary Grading

In any of the examples herein, a grading system can be used for module sizing (e.g., used when determining an implementation size of a module). A grading system can be used to weight different levels of implementation.

Table 1 below lists an example grading system with five levels. Points at each level are totaled and converted to points of the next higher level. The conversion factors determine how each level is weighted. For example, at the field level the conversion factor can be "5 values equals 1 field point."

TABLE 1

Example Grading System

| Level | Points |
|---|---|
| Module | # of process points equals 1 module point |
| Process | # of setup points equals 1 process point |
| Setup | # of form points equals 1 setup point |
| Form | # of field points equals 1 form point |
| Field | # of values equals 1 field point |

Example 6

Exemplary Standard Module

In any of the examples herein, a standard module refers to an implementation size of a pre-defined module. The pre-defined module can be used to represent the implementation size of a typical module for the software package. Once the implementation size of the pre-defined module is known, which is called one standard module, implementation sizes of other modules can be determined and compared relative to one standard module (e.g., in units of one standard module).

For example, a pre-defined module can have 10 business processes, each having 4 setups, each setup being performed using a form with 10 fields, and each field having 5 possible values. The implementation size of such a pre-defined module (a standard module) can be one module point.

A pre-defined module can be used to create a grading scale. Table 2 below lists a grading scale corresponding to the example pre-defined standard module.

TABLE 2

Example Standard Module

| Level | Points |
|---|---|
| Module | 10 process points is 1 module point |
| Process | 4 setup points is 1 process point |
| Setup | 1 form points is 1 setup point |
| Form | 50 field points is 1 form point |
| Field | 5 values is 1 field point |

Using the grading scale listed in Table 2, module points for other modules of a software package can be calculated. The module points for other modules will be in terms of a standard module. For example, if the implementation size of a module is calculated to be 3 module points, then the module would have an implementation size equivalent to three standard modules.

Example 7

Exemplary Implementation Size of a Package Implementation Project

In any of the examples herein, implementation size of a package implementation project refers to the size of the specific implementation project (e.g., module functionality, tasks, complexity factors, etc., that will be implemented for the project). Implementation can involve implementing a whole software package or only some parts (e.g., some modules) of a software package. The implementation size can be used to arrive at total effort that will be required to implement the software package (e.g., using organizational productivity based on past implementation projects). The implementation size of a package implementation project can depend on a variety of factors, such as implementation sizes of one or more modules of the software package, tasks needed to implement the software package, and the complexity factor of implementation of the software package.

The implementation size can reflect some or all aspects of a software package implementation. For example, implementation size can reflect the activities required to implement a software package, such as: discovery, gap analysis, installation, configuration, custom development, testing, and training.

Once the implementation size of a software package implementation is known, the amount of effort required to implement the software package can be determined. For example, if the implementation size is in terms of package points, and if the number of package points that can be implemented in a person month is known (e.g., from empirical data), then the effort in terms of person-months can be calculated.

Example 8

Exemplary Module Sizing

In any of the examples herein, the implementation size of one or more modules of a software package can be determined. The implementation size can be determined by evaluating characteristics of the modules at various levels. For example, the levels can comprise field level, form level, setup level, and process level.

Field level can refer to the fields (e.g., user-interface elements such as data fields, drop-down fields, buttons, check boxes, and other user interface elements) on a form. For example, an accounts receivable module can contain one or more forms with fields such as fields for setting payment terms, grace periods, credit terms, statement details, etc.

Form level can refer to the forms (e.g., user-interface pages presented to a user) used to configure functionality of the module. For example, form level for an accounts receivable module can contain one or more forms used to configure the functionality of the accounts receivable module.

Setup level can refer to the setup activities needed to implement the module. Depending on the implementation (e.g., depending on the needs of the customer for which the package is being implemented), some setup activities may or may not need to be performed and other setup activities may need to be performed multiple times.

Process level can refer to processes that are needed to implement the module. For example, the following processes can be involved with implementing an accounts receivable module: customer creation and maintenance, invoice generation, and collections.

Some levels can be configured using level parameters. Level parameters can be used at some or all levels, and each level can have zero or more level parameters. The same level parameters can be repeated at more than one level, or different level parameters can be used at each level. Examples of level parameters can be: criticality, data handling, and interaction. Each level parameter can be associated with values (e.g., criticality can be associated with "very high," "high," "medium," and "low" values, which can be selected by a user during module sizing).

In a specific implementation, level parameters can be used at process, setup, and field levels, and not at form level. In the specific implementation, each level parameter can have a relative weight with respect to the other level parameters at the same level. The sum of the weights at each level can be 1.

Example 9

Exemplary Tasks

In any of the examples herein, tasks refer to the activities that may be required to implement a software package. All of the standard tasks that are typically required to implement a software package can be grouped together (e.g., and called a standard task album). A user can make a selection of tasks (e.g., from the standard task album) that need to be performed for a specific package implementation project (e.g., to implement a specific software package for a specific business customer).

Tasks can have a number of aspects. In a specific implementation, tasks are divided into a fixed portion and a variable portion (e.g., fixed points and variable points where the points refer to effort in terms of person-days). The fixed portion remains the same regardless of the implementation size of the modules. The variable portion changes depending on the implementation size of the modules (e.g., the variable portion can be multiplied by the implementation size of the modules and added to the fixed portion).

Tasks can be assigned points. In a specific implementation, the points refer to effort in terms of person days needed to complete the task. Different point values can be assigned to the fixed and variable portions of the tasks.

Tasks can be assigned points depending on complexity factor. In a specific implementation, tasks are assigned fixed and variable points for each of multiple complexity factors (e.g., complexity factors ranging from 1 to 7). Task points at complexity level 1 can be totaled. The total points can be referred to as one standard package implementation, and used to calculate package points in terms of (e.g., units of) the one standard package implementation.

Example 10

Exemplary Complexity Factor

In any of the examples herein, complexity factor refers to the complexity of various aspects of a package implementation project. A single complexity factor can be determined for an entire package implementation project, or multiple complexity factors can be determined (e.g., different complexity factors for different aspects of the package implementation project). Complexity factors can be defined in a range from least complex (e.g., 1) to most complex (e.g., 7).

Complexity factors can be set directly. For example, a user in charge of sizing a package implementation project can select a specific complexity factor (e.g., select a value from 1 to 7 for the complexity factor).

Complexity factors can also be set indirectly. For example, a user in charge of sizing a package implementation project can select values for different complexity parameters. Complexity parameters can include, for example, number of users to be supported by the software package, number of languages to be supported, number of currencies to be supported, number of sets of accounting books, network architecture complexity, legacy system complexity, custom development, etc. A complexity value for each complexity parameter can then be selected (e.g., for the complexity parameter "number of languages," a value from the list "1, 2-3, 4-5, 6+" can be selected). From the values of the complexity parameters, one or more complexity factors can be determined (e.g., one or more complexity factors in the range of 1 to 7).

Example 11

Exemplary Standard Task Album

In any of the examples herein, an album of tasks typically required to implement a software package can be pre-defined. Along with the list of tasks in the album, points can be assigned for fixed and variable portions of the tasks for each of one or more complexity factors. For example, the points can be assigned based on empirical results from prior package implementation projects.

Table 3 below lists an example standard task album with fixed and variable points assigned for complexity factors 1 (least complex) and 7 (most complex).

TABLE 3

Example Standard Task Album

| Task | Fixed (CF = 1) | Variable (CF = 1) | Fixed (CF = 7) | Variable (CF = 7) |
|---|---|---|---|---|
| Task A | 2 | 3 | 5 | 7 |
| Task B | 4 | 2 | 12 | 6 |
| Task C | 3 | 3 | 10 | 10 |
| Task D | 6 | 2 | 15 | 4 |

The point count for fixed and variable tasks at complexity factor 1 can be totaled and defined as one standard task album. Using the points from Table 3, the standard task album would equal 25 points.

Using the point totals for a standard task album at least complexity, percentage values can be assigned to point values at other complexities. Table 4 below lists percentage values in terms of a standard task album (25 points in this example) using the points listed in Table 3.

TABLE 4

Example percentages in terms of a standard task album

| Task | Fixed (CF = 1) | Variable (CF = 1) | Fixed (CF = 7) | Variable (CF = 7) |
|---|---|---|---|---|
| Task A | 8% | 12% | 20% | 28% |
| Task B | 16% | 8% | 48% | 24% |
| Task C | 12% | 12% | 40% | 40% |
| Task D | 24% | 8% | 60% | 16%. |

The percentages in Table 4 can be called percent standard usage.

Example 12

Exemplary Task Equations

In any of the examples herein, task equations can be used when calculating implementation size of a package implementation project. Task equations can be used to factor in the complexity factor. Different task equations can be used for fixed and variable portions of the tasks.

In a specific implementation, the following task equations are used:

$M*(CF)^2+C$ for fixed portion; M and C are constants $A*(CF)^2+B$ for variable portion; A and B are constants The constants (A, B, M, and C) are specific to the selected tasks. These task equations can be used when calculating the implementation size of a software package implementation project.

Example 13

Exemplary Sizing a Package Implementation Project

In any of the examples herein, an implementation size of a software package implementation project can be determined. The implementation size can be determined based on implementation sizes of the modules of the software package to be implemented, the tasks to be implemented, and the complexity factor.

In a specific implementation, the following equation is used to calculate the implementation size of the software package implementation project for a module:

Size=Module Size*Task Equation (variable)+Task Equation (fixed)

Where module size is the implementation size of the module to be implemented in terms of a standard module, task equation (variable) is $M*(CF)^2+C$, and task equation (fixed) is $A*(CF)^2+B$. As this equation illustrates, the variable portion of the selected tasks scales with the module size while the fixed portion of the selected tasks does not change depending on the selected modules. In order to calculate the implementation size of the whole software package implementation project, the equation above would be performed for each module and the results totaled.

Example 14

Exemplary Method for Determining Implementation Size

FIG. 1 shows an exemplary method 100 for determining an implementation size of a software package implementation project. The method 100 can be implemented at least in part by a computing device (e.g., desktop computers, notebook computers, server computers, portable computing devices, and the like). For example, the computing device can run one or more software applications (e.g., a sizing tool) implementing the method.

At 110 implementation sizes for one or more modules of the software package are determined. For example, the implementation sizes can be determined by adding points at various levels (e.g., field level, form level, setup level, process level, and module level) using a grading system. The implementation sizes can also be determined by selecting functionality to be implemented for the one or more modules. The implementation size can be in terms of a standard module (e.g., in units of a standard module).

At 120, one or more tasks to be implemented are determined. For example, the one more tasks can be selected (e.g., by a user via a sizing tool) from a standard album of tasks. The tasks can be associated with respective fixed and variable portions (e.g., fixed and variable points). Fixed and variable portions can be assigned for each of multiple complexity factors.

At 130, a complexity factor is determined for the software package implementation project. For example, the complexity factor can be determined based on one or more complexity values selected by a user via a sizing tool.

At 140, the size of the software package implementation project is calculated. For example, the size can be calculated based on the implementation sizes for the one or more modules, the one or more tasks to be implemented, and the complexity factor. The size can be calculated using task equations.

Example 15

Exemplary Framework for Determining Implementation Size

Figure 2:
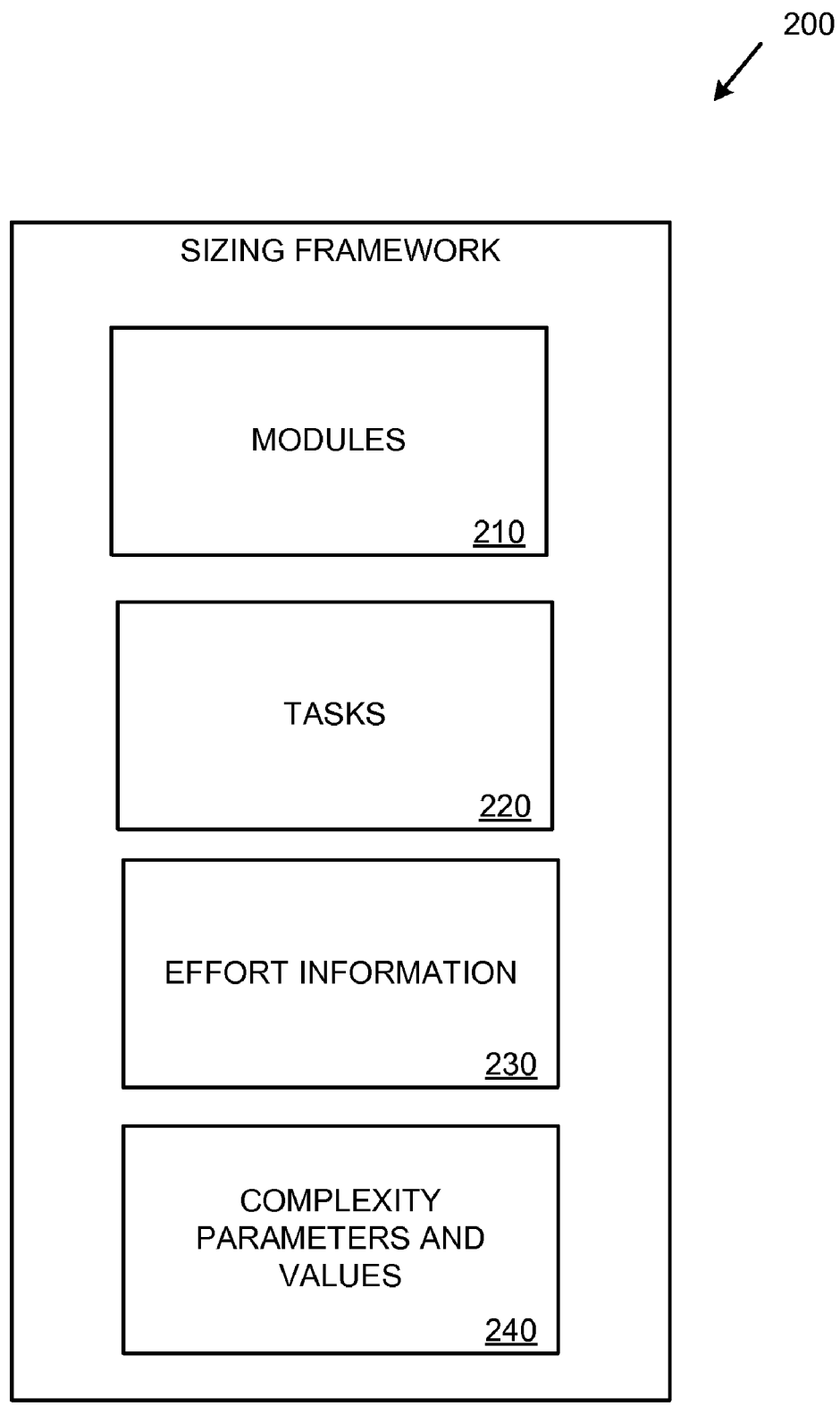
FIG. 2 is a diagram showing exemplary framework for determining an implementation size of a software package implementation project.

FIG. 2 shows an exemplary framework 200 for determining an implementation size of a software package implementation project. The example framework 200 comprises repositories for modules 210, tasks 220, effort information 230, and complexity parameters and values 240. The repositories (210, 220, 230, and 240) can be implemented in a variety of ways (e.g., databases, files, spreadsheets, and the like). The framework 200 can be implemented at least in part by a computing device. For example, the computing device can run one or more software applications (e.g., a sizing tool) implementing the framework.

The modules 210 repository contains information regarding one or more modules of the software package. The information can comprise the functionality available to be implemented for respective modules.

The tasks 220 repository contains information regarding one or more tasks that can be implemented for the software package. Some or all of the tasks can be grouped into a standard task album.

The effort information 230 repository contains effort information regarding the tasks in the tasks 220 repository. The effort information can comprise points for fixed and variable portions of the tasks for each of one or more complexity factors.

The complexity parameters and values 240 repository contains information regarding complexity parameters and values. Complexity factors can be determined based on selection of complexity values for corresponding complexity parameters.

Example 16

Exemplary Sizing Levels

Figure 3:
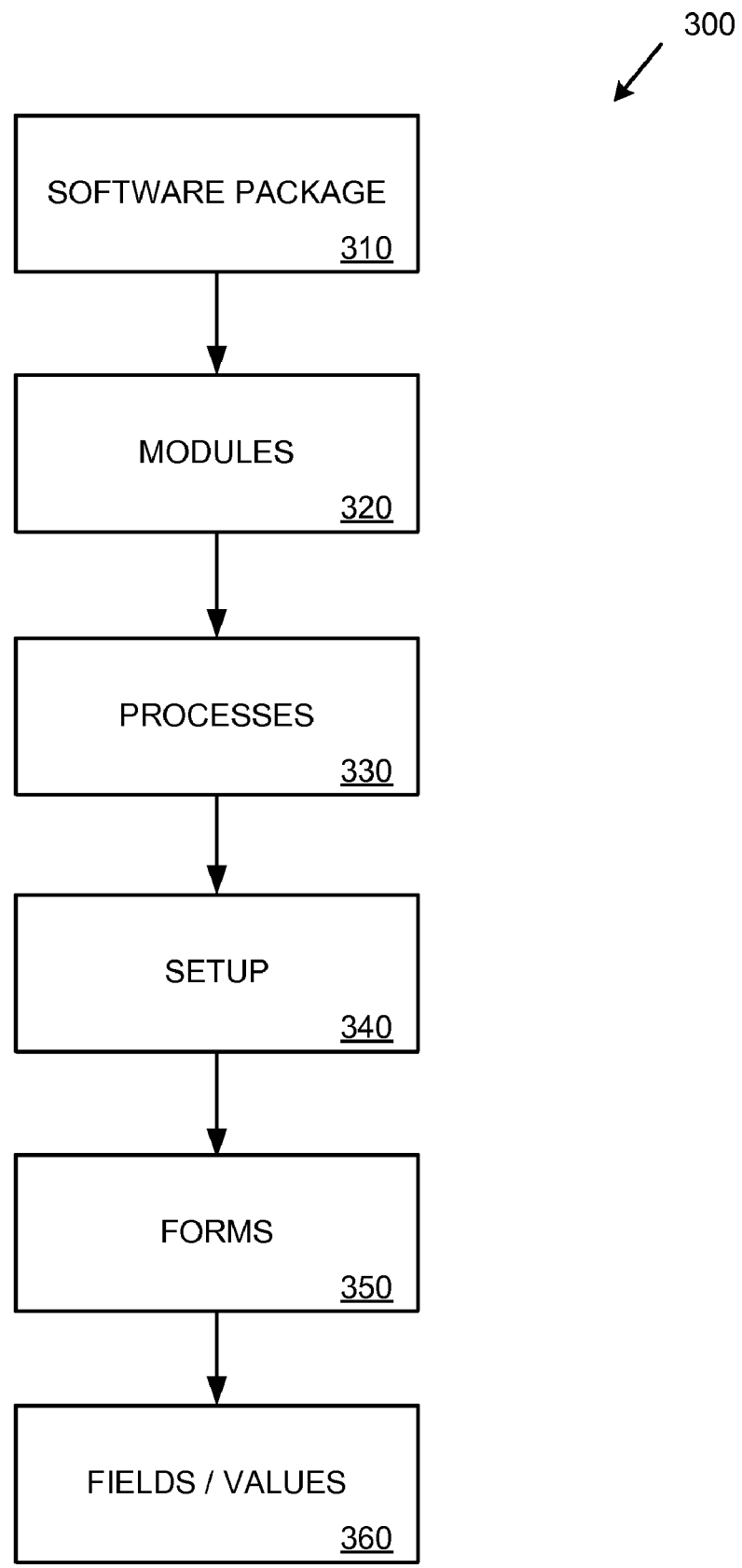
FIG. 3 is a diagram showing exemplary module sizing levels.

FIG. 3 shows exemplary sizing levels 300 for use in determining an implementation size of a software package implementation project. Dividing a software package up into sizing levels 300 can result in a more accurate determination of implementation size.

In the example, a software package 310 is divided into one or more modules 320. The modules 320 are implemented using processes 330. The processes 330 require setup activities 340. The setup activities 340 are accomplished using forms 350. The forms 350 contain fields with values 360.

Figure 4:
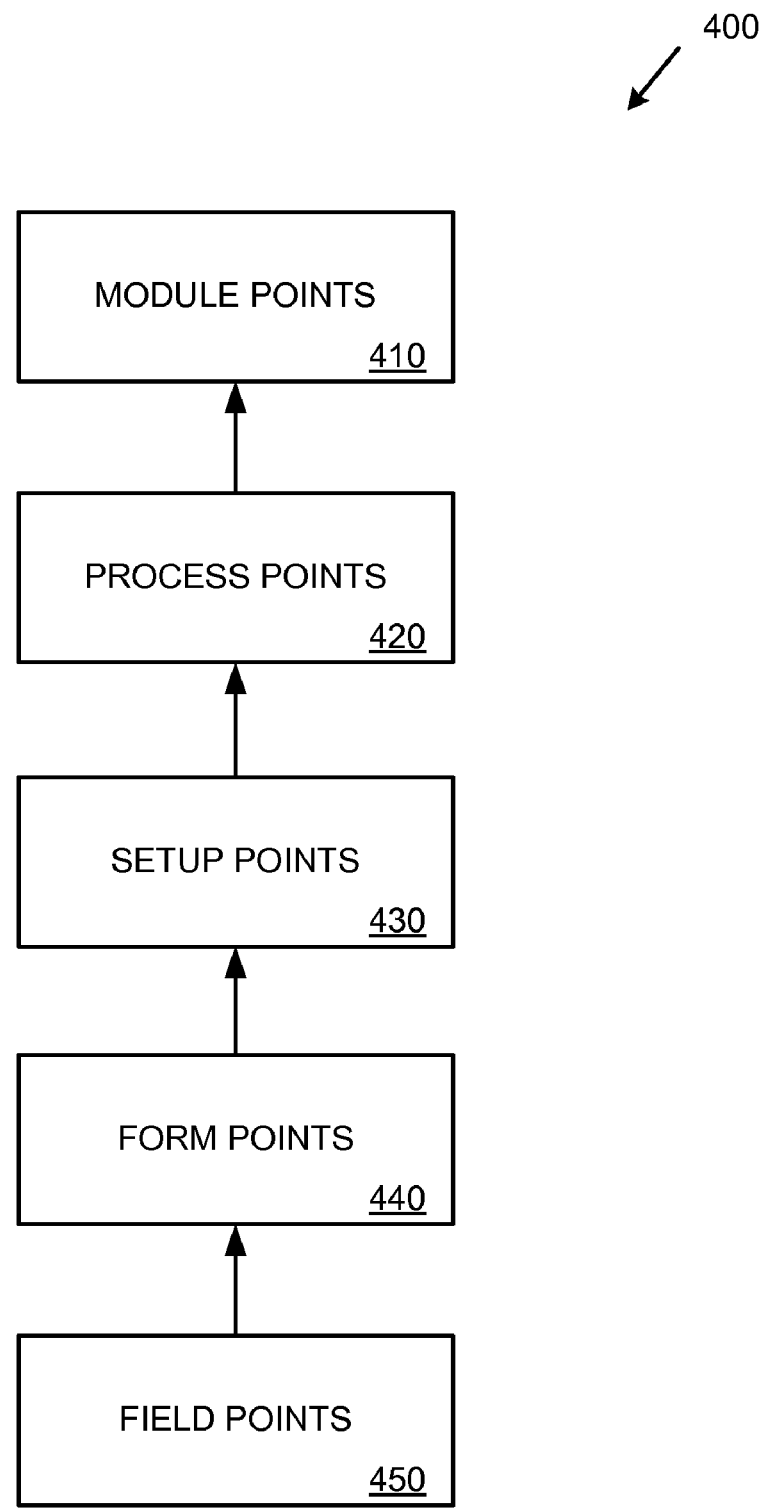
FIG. 4 is a diagram showing exemplary module sizing.

FIG. 4 shows an exemplary diagram 400 for determining an implementation size of a module using sizing levels. In the example, field points 450 can be calculated based on the number of fields and the number of possible values for each field. Form points 440 can be calculated based on the number of forms required to implement the module. Setup points 430 can be calculated based on the number of setup activities required to implement the module. Process points 420 can be calculated based on the number of processes needed to implement the module. Finally, module points 410 can be calculated based on the process points 420, setup points 430, form points 440, and field points 450.

For example, module points 410 can be calculated using a grading system, such as the grading system depicted in Table 1 above.

Example 17

Exemplary User Interfaces

FIGS. 5 through 9 show exemplary user interfaces of a specific implementation of a sizing tool for determining an implementation size of a software package implementation project. The user interfaces depicted in FIGS. 5 through 9 can be displayed by the sizing tool. The sizing tool can be implemented by a computing device.

FIG. 5 shows an exemplary user interface 500 for selecting modules 510 of a software package. An arbitrary number of modules can be displayed in the user interface 500. A user can select one or more modules from those displayed 510. In the user interface 500, three modules are selected, Module A, Module B, and Module D. Various types of user interface elements can be used accept a selection of modules, such as check boxes, drop-down lists, radio buttons, etc.

Figure 6:
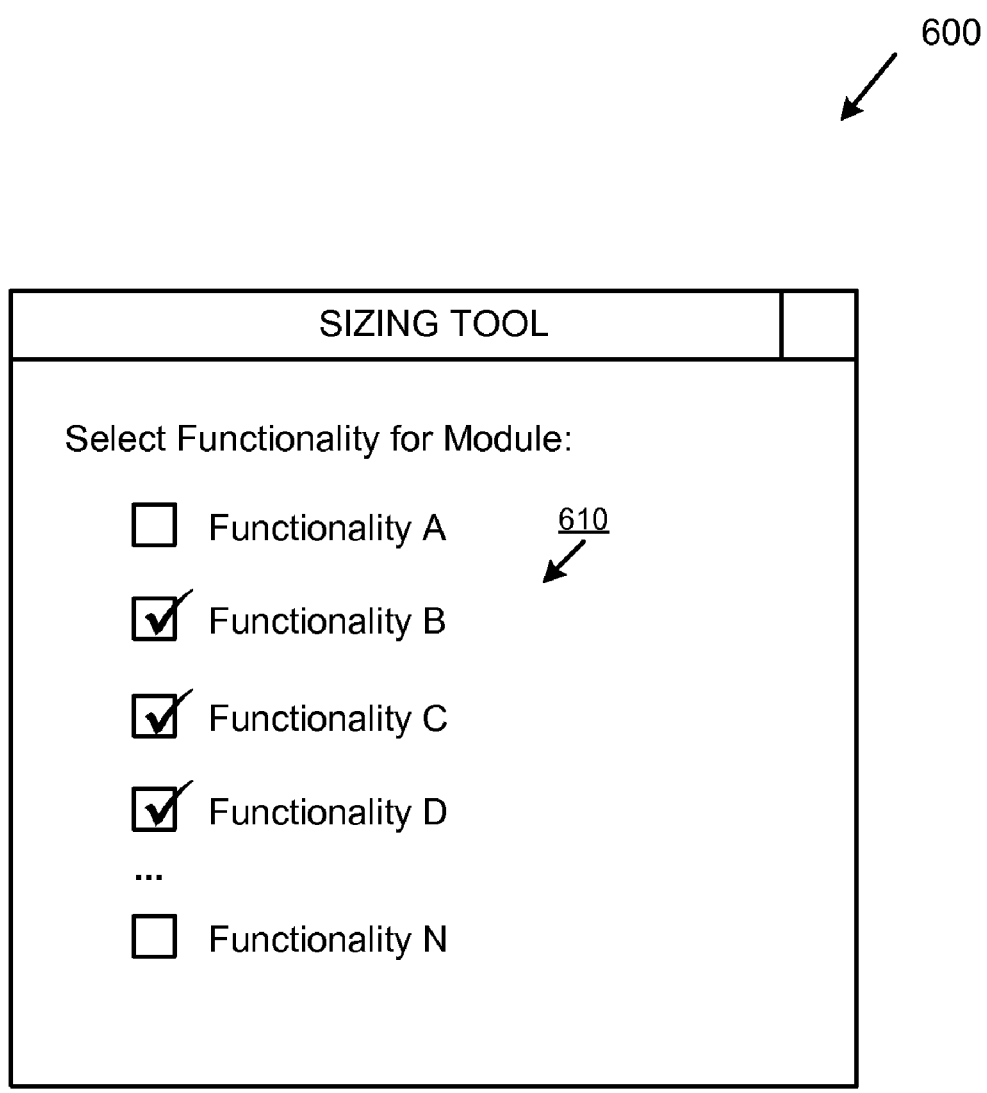
FIG. 6 is a diagram showing an exemplary user interface for selecting functionality for modules.

FIG. 6 shows an exemplary user interface 600 for selecting functionality for a selected module. In the user interface 600, Functionality B, Functionality C, and Functionality D are selected (e.g., selected for Module A). For example, each time one of the modules is selected using user interface 500, the user interface 600 can be displayed for selecting the functionality that will be implemented for the selected module. Each selected module can be associated with its own list of functionality. The same functionality can also be associated with more than one module.

Figure 7:
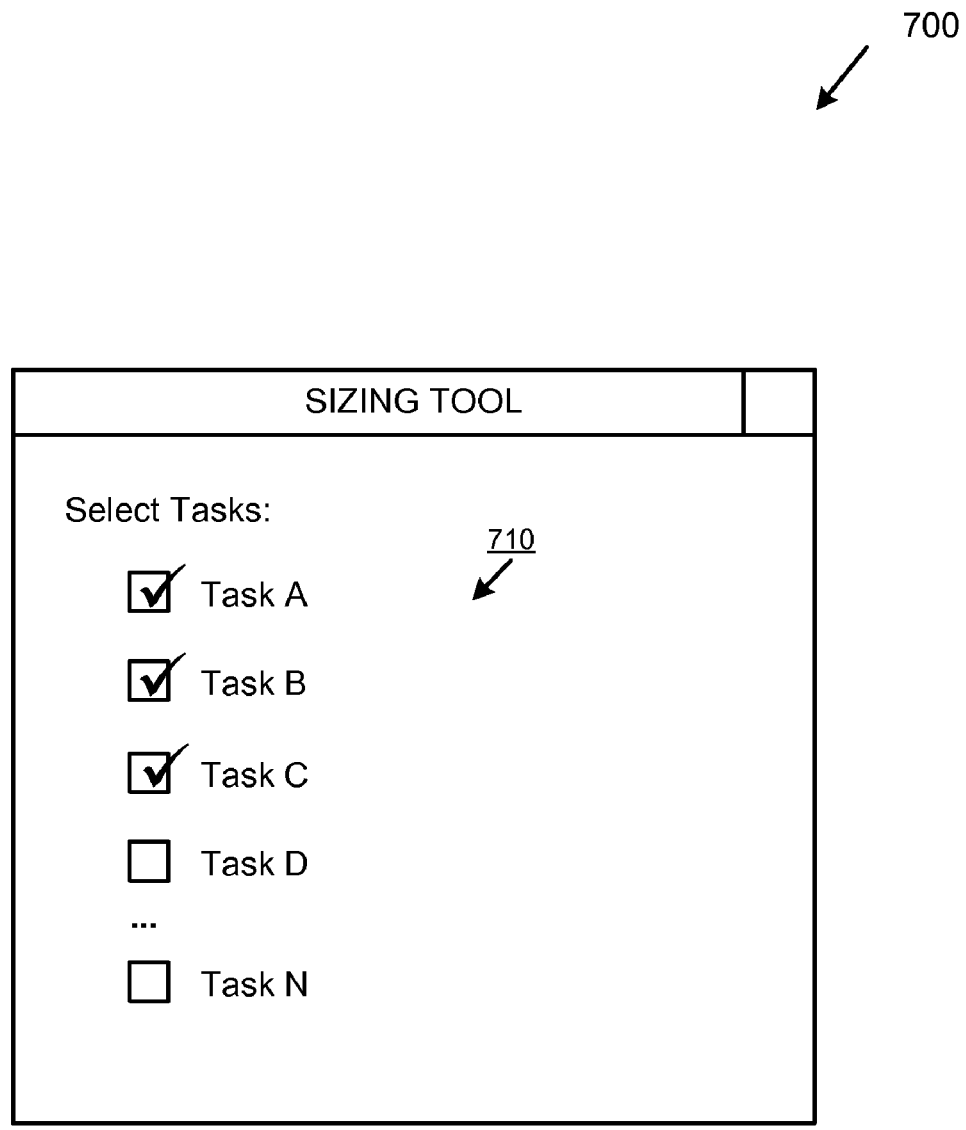
FIG. 7 is a diagram showing an exemplary user interface for selecting tasks.

FIG. 7 shows an exemplary user interface 700 for selecting tasks to be implemented. An arbitrary number of tasks can be displayed 710 in the user interface 700. A user can select one or more tasks from those displayed 710 (e.g., the displayed tasks can be tasks from a standard task album). In the user interface 700, three tasks are selected, Task A, Task B, and Task C. Various types of user interface elements can be used accept a selection of tasks, such as check boxes, drop-down lists, radio buttons, etc.

Figure 8:
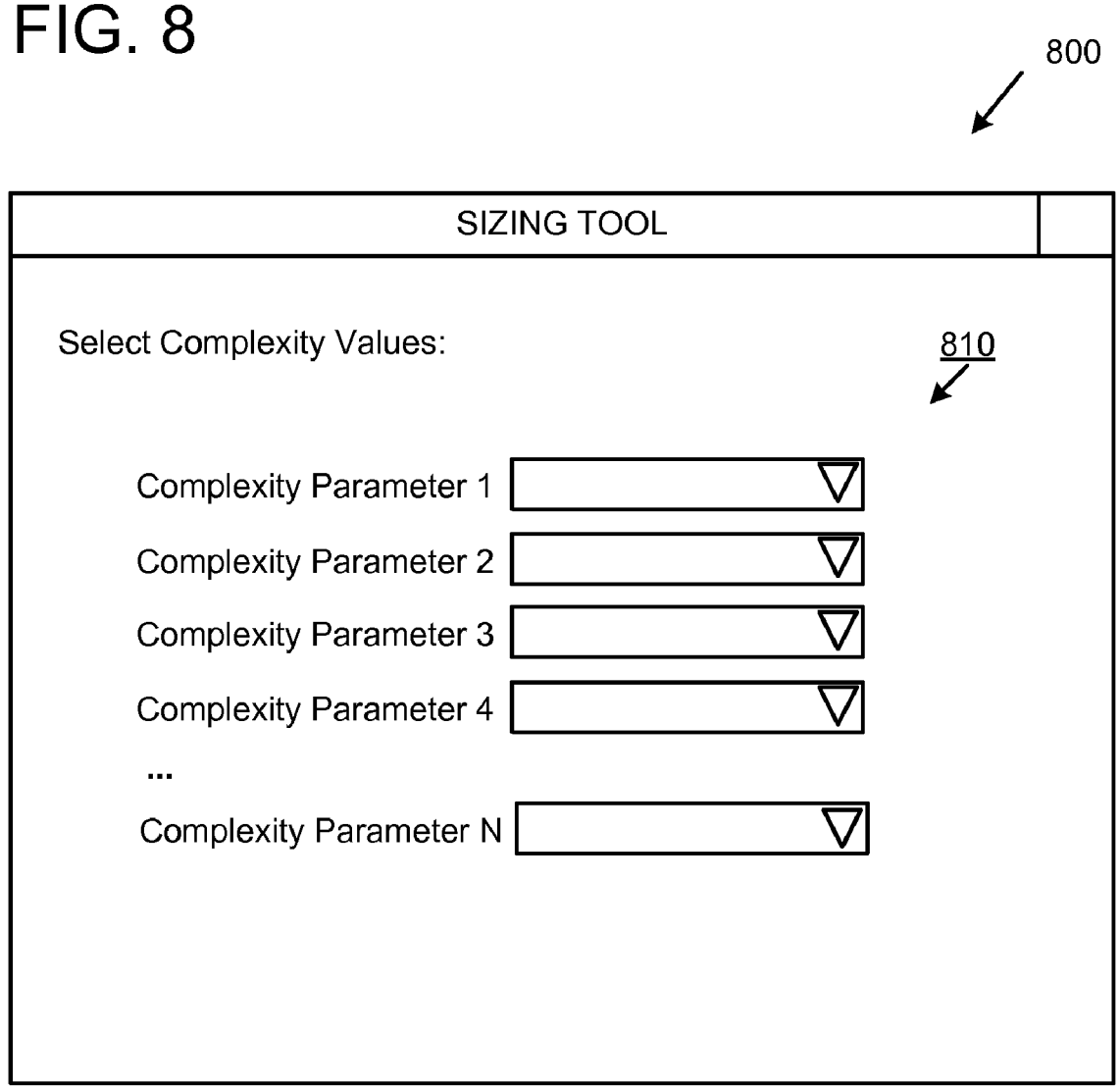
FIG. 8 is a diagram showing an exemplary user interface for selecting complexity values.

FIG. 8 shows an exemplary user interface 800 for selecting complexity values for complexity parameters. An arbitrary number of complexity parameters can be displayed 810 in the user interface 800. A user can select a value for one or more of the complexity parameters. A sizing tool can use the selected complexity values in determining a complexity factor (or multiple complexity factors). Various types of user interface elements can be used accept selection of complexity values, such as check boxes, drop-down lists, data entry fields, etc.

Figure 9:
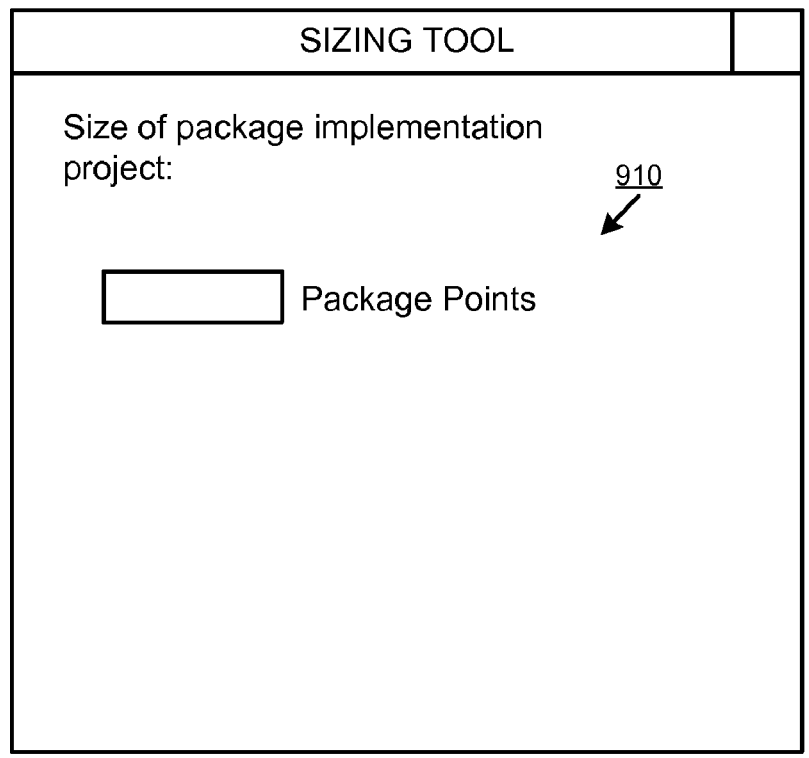
FIG. 9 is a diagram showing an exemplary user interface displaying implementation size for a software package implementation project.

FIG. 9 shows an exemplary user interface 900 for displaying an implementation size of a software package implementation project. For example, the user interface 900 can be displayed after a user has used a sizing tool to complete the user interfaces depicted in FIGS. 5 through 8. Once the sizing tool has calculated the implementation size of the software package implementation project, the sizing tool can display 910 the implementation size using user interface. For example, the implementation size of the software package implementation project can be displayed 910 as a number indicating a size relative to a pre-defined standard package implementation project (e.g., in package points)

Example 18

Exemplary Equations and Calculations

FIG. 10 shows example equations and calculations, for a specific implementation, for determining an implementation size of a software package implementation project. In the example 1000, package points are calculated using module sizes and percent standard usage for variable and fixed portions of selected tasks.

Example 19

Exemplary Sizing Tool Screenshots

FIGS. 11A-11J are diagrams showing exemplary screenshots of a specific implementation of a sizing tool for determining an implementation size of a software package implementation project. The sizing tool can be implemented by a computing device.

Figure 11A:
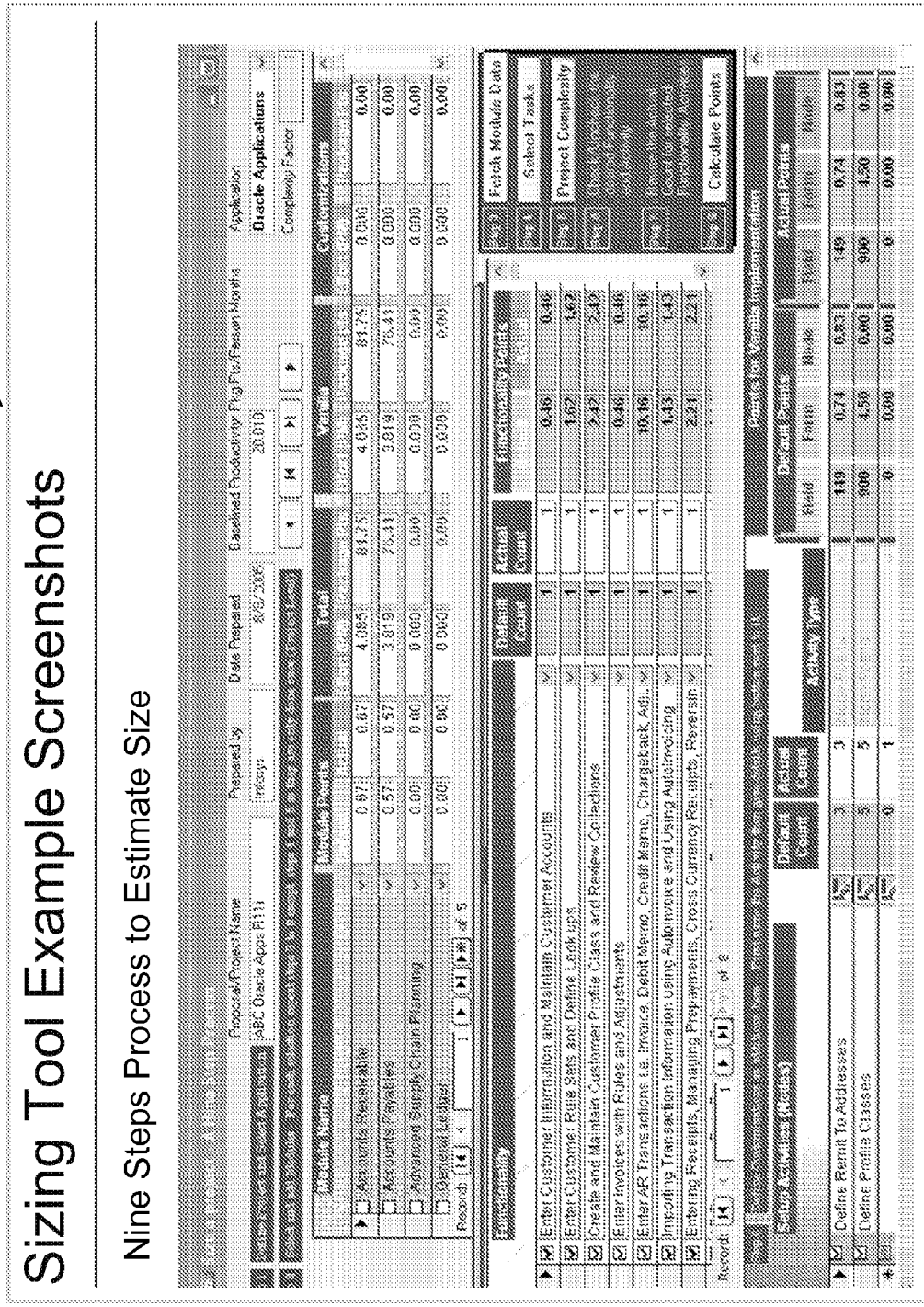
Figure 11C:
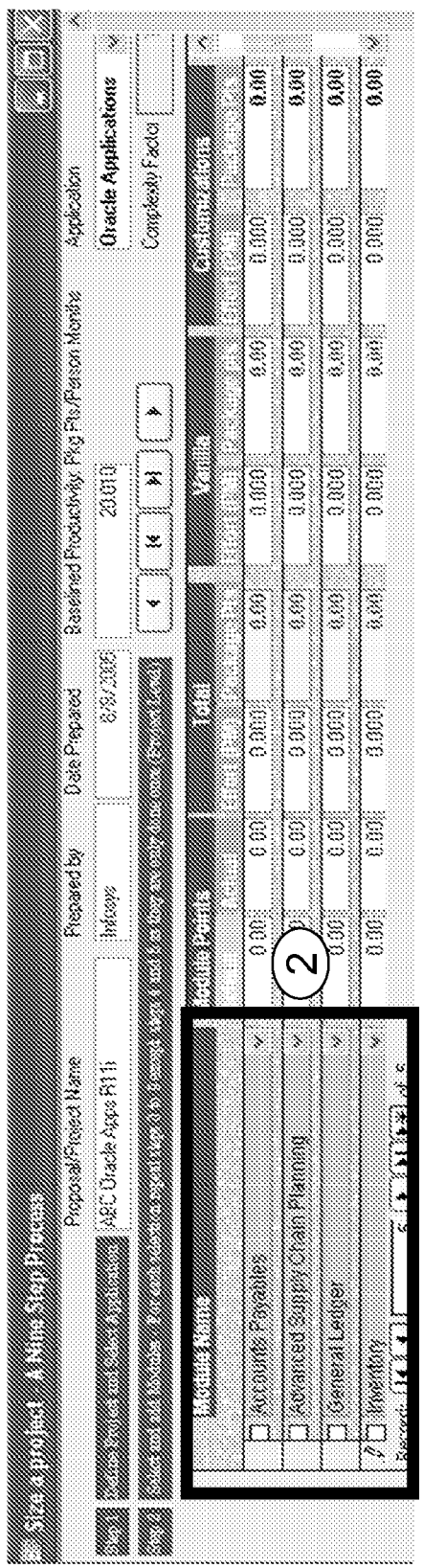
Figure 11J:
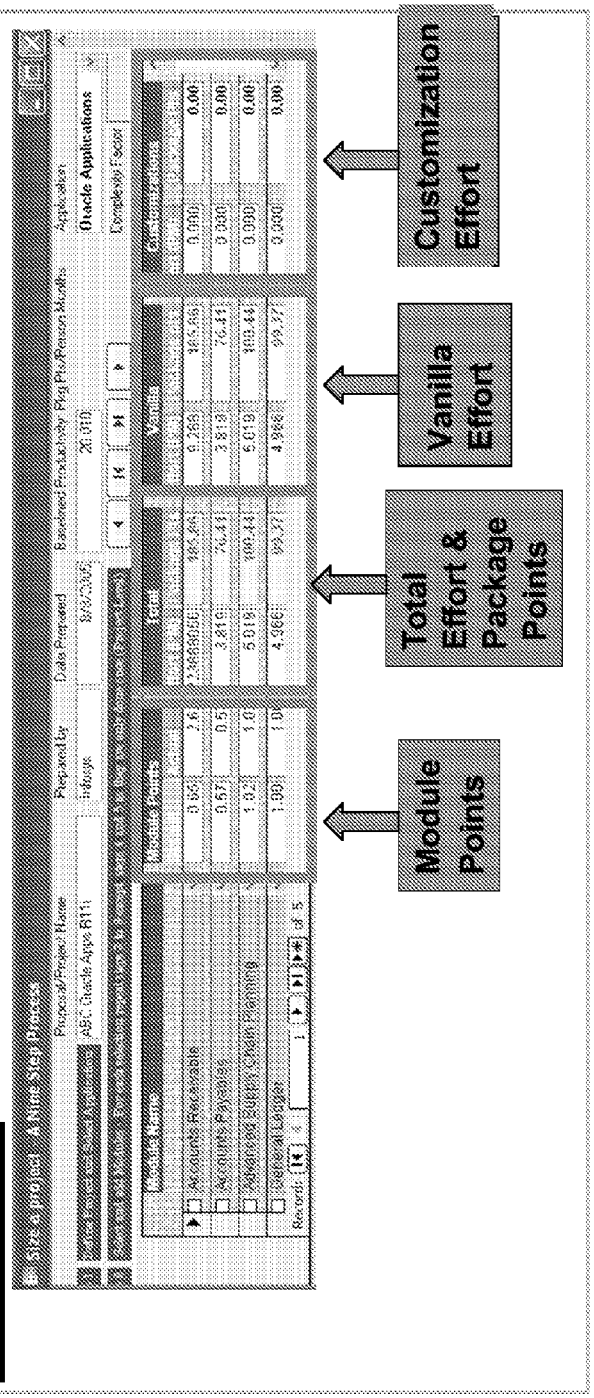

The screenshots can be used to implement a nine-step process for determining an implementation size of a software package implementation project. For example, the nine steps can be as follows:
1. Define Project and Select Application
2. Select and Add Module—For Each Module repeat steps 3 to 9 except steps 4 and 5 as they are done only once (Project Level)
3. Fetch Module Data
4. Select Tasks
5. Project Complexity
6. Check/Uncheck desired Functionality and Activities
7. Revise the actual count for selected Functionality and Activities
8. Define Customizations as additions here—First Name the activity and then give details using button next to it. In case of Vanilla Implementation this step should be skipped.
9. Calculate Points For example, the equations and calculations depicted in FIG. 10 can be used to determine the implementation size, in package points, as depicted in FIG. 11J.

Example 20

Exemplary Implementation Sizing

FIGS. 12A-12I are diagrams showing an example software package implementation sizing. The example diagrams 12A-12I depict example sizing calculations for an example software package implementation project.

Example 21

Exemplary Computing Environment

Figure 13:
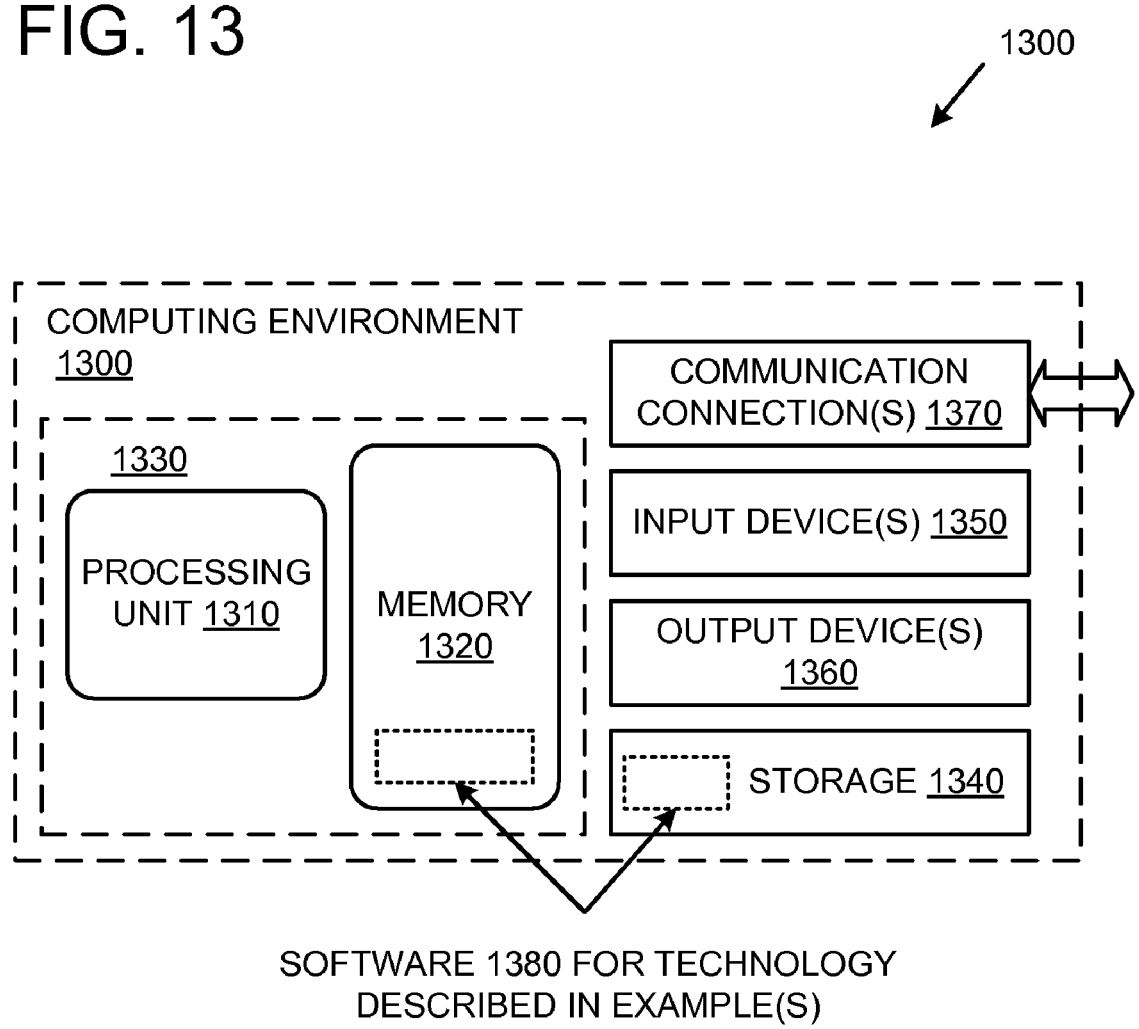
FIG. 13 is a block diagram illustrating an example of a computing environment that can be used to implement any of the technologies described herein.

FIG. 13 illustrates a generalized example of a suitable computing environment 1300 in which described examples, embodiments, techniques, and technologies may be implemented. The computing environment 1300 is not intended to suggest any limitation as to scope of use or functionality of the technology, as the technology may be implemented in diverse general-purpose or special-purpose computing environments. For example, the disclosed technology may be implemented with other computer system configurations, including hand held devices, multiprocessor systems, microprocessor-based or programmable consumer electronics, network PCs, minicomputers, mainframe computers, and the like. The disclosed technology may also be practiced in distributed computing environments where tasks are performed by remote processing devices that are linked through a communications network. In a distributed computing environment, program modules may be located in both local and remote memory storage devices.

With reference to FIG. 13, the computing environment 1300 includes at least one central processing unit 1310 and memory 1320. In FIG. 13, this most basic configuration 1330 is included within a dashed line. The central processing unit 1310 executes computer-executable instructions and may be a real or a virtual processor. In a multi-processing system, multiple processing units execute computer-executable instructions to increase processing power and as such, multiple processors can be running simultaneously. The memory 1320 may be volatile memory (e.g., registers, cache, RAM), non-volatile memory (e.g., ROM, EEPROM, flash memory, etc.), or some combination of the two. The memory 1320 stores software 1380 that can, for example, implement the technologies described herein. A computing environment may have additional features. For example, the computing environment 1300 includes storage 1340, one or more input devices 1350, one or more output devices 1360, and one or more communication connections 1370. An interconnection mechanism (not shown) such as a bus, a controller, or a network, interconnects the components of the computing environment 1300. Typically, operating system software (not shown) provides an operating environment for other software executing in the computing environment 1300, and coordinates activities of the components of the computing environment 1300.

The storage 1340 may be removable or non-removable, and includes magnetic disks, magnetic tapes or cassettes, CD-ROMs, CD-RWs, DVDs, or any other medium which can be used to store information and which can be accessed within the computing environment 1300. The storage 1340 stores instructions for the software 1380, which can implement technologies described herein.

The input device(s) 1350 may be a touch input device, such as a keyboard, keypad, mouse, pen, or trackball, a voice input device, a scanning device, or another device, that provides input to the computing environment 1300. For audio, the input device(s) 1350 may be a sound card or similar device that accepts audio input in analog or digital form, or a CD-ROM reader that provides audio samples to the computing environment 1300. The output device(s) 1360 may be a display, printer, speaker, CD-writer, or another device that provides output from the computing environment 1300.

The communication connection(s) 1370 enable communication over a communication medium (e.g., a connecting network) to another computing entity. The communication medium conveys information such as computer-executable instructions, compressed graphics information, or other data in a modulated data signal.

Computer-readable media are any available media that can be accessed within a computing environment 1300. By way of example, and not limitation, with the computing environment 1300, computer-readable media include memory 1320, storage 1340, communication media (not shown), and combinations of any of the above.

Example 22

Exemplary Automated Methods

Any of the methods described herein can be performed via one or more computer-readable media (e.g., storage or other tangible media) having computer-executable instructions for performing (e.g., causing a computing device or computer to perform) such methods. Operation can be fully automatic, semi-automatic, or involve manual intervention.

Example 23

Exemplary Combinations

The technologies of any example described herein can be combined with the technologies of any one or more other examples described herein.

Example 24

Exemplary Alternatives

In view of the many possible embodiments to which the principles of the disclosed invention may be applied, it should be recognized that the illustrated embodiments are only preferred examples of the invention and should not be taken as limiting the scope of the invention. Rather, the scope of the invention is defined by the following claims. We therefore claim as our invention all that comes within the scope and spirit of these claims.

We claim:

1. A method, implemented at least in part by a computing device comprising a processing unit and memory, for determining an implementation size of a software package implementation project using a sizing framework, the method comprising:
    determining implementation sizes for one or more modules of the software package by evaluating level parameters of the one or more modules at a plurality of levels, comprising:
        evaluating the one or more modules at field level;
        evaluating the one or more modules at form level;
        evaluating the one or more modules at setup level; and
        evaluating the one or more modules at process level;
    determining one or more tasks to be implemented for the software package implementation project, wherein each of the one or more tasks comprises:
        a fixed portion of the task that remains the same regardless of the implementation sizes of the one or more modules; and
        a variable portion of the task that changes depending on the implementation sizes of the one or more modules;
    determining a complexity factor for the software package implementation project;
    calculating, by the computing device, the implementation size of the software package implementation project based at least on the implementation sizes of the one or more modules, the one or more tasks to be implemented, and the complexity factor, wherein the calculating the implementation size of the software package implementation project comprises:
        using a first task equation for calculating the fixed portion of the one or more tasks, wherein the first task equation increases with the square of the complexity factor; and
        using a second task equation for calculating the variable portion of the one or more tasks, wherein the second task equation increases with the square of the complexity factor; and
    outputting the implementation size of the software package implementation project.

2. The method of claim 1 wherein the determining one or more tasks to be implemented for the software package implementation project comprises: receiving, from a user, a selection of the one or more tasks from a standard task album, wherein the standard task album contains a pre-defined plurality of tasks available for selection for the software package implementation project.

3. The method of claim 1 wherein the determining the complexity factor for the software package implementation project comprises: receiving, from a user, a selection of one or more values for one or more complexity parameters from which the complexity factor is determined.

4. The method of claim 1 wherein the implementation sizes for the one or more modules is in terms of a pre-defined standard module.

5. The method of claim 1 wherein the calculating the implementation size of the software package implementation project comprises multiplying the implementation sizes of the one or more modules by the complexity factor and summing the results of the multiplication.

6. The method of claim 1 wherein the implementation size of the software package implementation project is in terms of package points, wherein one package point refers to an implementation size of a pre-defined standard software package implementation project.

7. One or more computer-readable storage media storing computer-executable instructions for causing the computing device to perform the method of claim 1.

8. A sizing framework, implemented at least in part by a computing device comprising a processing unit and memory, for determining an implementation size of a software package implementation project, the sizing framework comprising:
    a repository of one or more modules of the software package and functionality provided by each of the one or more modules, wherein an implementation size of the one or more modules is determined via selection of functionality to be implemented for the one or more modules by evaluating level parameters of the one or more modules at a plurality of levels, comprising:
        evaluating the one or more modules at field level;
        evaluating the one or more modules at form level;
        evaluating the one or more modules at setup level; and
        evaluating the one or more modules at process level;
    a repository of a standard album of tasks of the software project, wherein one or more tasks are selected from the standard album of tasks;
    a repository of effort information for each task of the standard album of tasks, wherein the effort information comprises fixed effort information for each of a plurality of complexity factors and variable effort information for each of the plurality of complexity factors, wherein the fixed effort information remains the same regardless of the implementation size of the one or more modules, and wherein the variable effort information changes depending on the implementation size of the one or more modules; and
    a repository of complexity values for corresponding complexity parameters, wherein one or more complexity factors are determined based on a selection of one or more complexity values for one or more corresponding complexity parameters;
    wherein the implementation size of the software package implementation project is calculated, by the computing device, based at least on the implementation size of the one or more modules, the selected one or more tasks, the effort information, and the one or more complexity factors, wherein the calculating the implementation size of the software package implementation project comprises:

using a first task equation for calculating a fixed portion of the one or more tasks, wherein the first task equation increases with the square of the one or more complexity factors; and using a second task equation for calculating a variable portion of the one or more tasks, wherein the second task equation increases with the square of the one or more complexity factors; and wherein the implementation size is stored by the computing device.

9. A sizing tool, implemented at least in part by a computing device comprising a processing unit and memory, for determining an implementation size of a software package implementation project, the sizing tool comprising:

one or more user-interface pages for receiving a selection of one or more modules to be implemented for the software package;

one or more user-interface pages for receiving a selection of functionality of the one or more selected modules at a plurality of levels, comprising:

receiving selection of functionality of the one or more modules at field level;

receiving selection of functionality of the one or more modules at form level;

receiving selection of functionality of the one or more modules at setup level; and receiving selection of functionality of the one or more modules at process level; one or more user-interface pages for receiving a selection of one or more tasks to be implemented for the software package, wherein the one or more tasks have a fixed portion and a variable portion, wherein the fixed portion remains the same regardless of the one or more selected modules, and wherein the variable portion changes depending on the one or more selected modules; and one or more user-interface pages for receiving a selection of one or more complexity values for one or more complexity factor parameters, wherein the sizing tool calculates a complexity factor for the software package implementation project based on the selected one or more complexity values;

wherein the sizing tool calculates, by the computing device, the implementation size of the software package implementation project based at least on the one or more selected modules, the selected functionality of the one or more selected modules, the one or more selected tasks, and the one or more selected complexity values, wherein the calculating the implementation size of the software package implementation project comprises:

using a first task equation for calculating the fixed portion of the one or more tasks, wherein the first task equation increases with the square of the complexity factor; and using a second task equation for calculating the variable portion of the one or more tasks, wherein the second task equation increases with the square of the complexity factor; and wherein the sizing tool outputs the implementation size of the software package implementation project.

10. The sizing tool of claim 9 wherein the one or more user-interface pages for receiving a selection of one or more modules display modules from a standard album of modules from which the selection of one or more modules is made.

11. The sizing tool of claim 9 wherein the receiving the selection of functionality of the one or more selected modules comprises: receiving a number of modules points for each of the one or more selected modules.

12. The sizing tool of claim 9 wherein the one or more tasks are selected from a pre-defined standard album of tasks.

13. A method, implemented at least in part by a computing device comprising a processing unit and memory, for determining effort required to implement a software package implementation project, the method comprising:

determining functionality to be implemented for one or more modules of the software package, wherein the determining functionality comprises selecting a plurality of parameter values for a corresponding plurality of level parameters, wherein the selecting the plurality of level parameters comprises:

selecting level parameters for the one or more modules at field level;

selecting level parameters for the one or more modules at form level;

selecting level parameters for the one or more modules at setup level; and selecting level parameters for the one or more modules at process level;

determining one or more tasks to be implemented for the software package implementation project, wherein the determining the one or more tasks comprises selecting the one or more tasks from a plurality of project phases, and wherein each of the one or more tasks comprises:

a fixed portion of the task that remains the same regardless of implementation sizes of the one or more modules; and a variable portion of the task that changes depending on the implementation sizes of the one or more modules;

determining a complexity factor for the software package implementation project, wherein the determining the complexity factor comprises selecting a plurality of complexity factor values for a corresponding plurality of complexity factor parameters; and calculating, by the computing device, the effort required to implement the software package implementation project based at least on the functionality to be implemented for one or more modules, the one or more tasks to be implemented, the complexity factor, and historical productivity data, wherein the calculating the effort required to implement the software package implementation project comprises:

using a first task equation for calculating the fixed portion of the one or more tasks, wherein the first task equation increases with the square of the complexity factor; and using a second task equation for calculating the variable portion of the one or more tasks, wherein the second task equation increases with the square of the complexity factor; and outputting the effort required to implement the software package implementation project.

14. The method of claim 1 wherein the implementation size of the software package implementation project represents effort needed to implement the software package implementation project, the method further comprising: calculating total effort for implementing the software package implementation project by multiplying the implementation size by a productivity measure.

15. The method of claim 14 wherein the productivity measure relates the implementation size to effort in terms of person-months.

* * * * *

UNITED STATES PATENT AND TRADEMARK OFFICE
CERTIFICATE OF CORRECTION

| | |
|---|---|
| PATENT NO. | : 8,020,147 B2 |
| APPLICATION NO. | : 11/871549 |
| DATED | : September 13, 2011 |
| INVENTOR(S) | : Chaturvedi et al. |

It is certified that error appears in the above-identified patent and that said Letters Patent is hereby corrected as shown below:

<u>In the Figures:</u>

In FIG. 11D, in line 7 of the narrative, the words "functionality which require" should be --functionalities which require--.

In FIG. 11D, in line 7 of the narrative, the words "have been give" should be --have been given--.

In FIG. 11E, in line 2 of the narrative, the words "forms gives" should be --form gives--.

In FIG. 11F, in line 2 of the narrative, the words "forms gives" should be --form gives--.

In FIG. 11F, in lines 4-5 of the narrative, the words "parameter have" should be --parameters have--.

In FIG. 11G, in line 2 of the narrative, the words "user click" should be --a user clicks--.

In FIG. 11G, in line 3 of the narrative, the word "is" should be --are--.

In FIG. 11H, in line 4 of the narrative, the words "these functionality" should be --these functionalities--.

In FIG. 12A, in the second heading, the word "Solutionv" should be --Solutions--.

In FIG. 12B, in the last line of the figure, the word "Sofyware" should be --Software--.

In FIG. 12C, in line 3 of the narrative under the heading *Graded Default and Actual Field Points*, the words "point are" should be --points are--.

In FIG. 12C, in the last line of the figure, the word "Payabale" should be --Payable--.

In FIG. 12D, in line 2 of the narrative under the heading *Default and Actual Form Points*, the word "Acutal" should be --Actual--.

In FIG. 12D, in the last line of the first table, the word "Payabale" should be --Payable--.

In FIG. 12D, in the last line of the second table, the word "Payabale" should be --Payable--.

Signed and Sealed this
Twelfth Day of February, 2013

Teresa Stanek Rea
*Acting Director of the United States Patent and Trademark Office*

CERTIFICATE OF CORRECTION (continued)
U.S. Pat. No. 8,020,147 B2

In FIG. 12E, in the last line of the first table, the word "Payabale" should be --Payable--.

In FIG. 12E, in the fourth column heading of the second table, the word "Acutal" should be --Actual--.

In FIG. 12E, in the last line of the second table, the word "Payabale" should be --Payable--.

In FIG. 12H, in the first table, under the column heading *Parameter Type*, the word "Sofyware" should be --Software--.

In FIG. 12I, in the second narrative note, the word "Effot" should be --Effort--.

In FIG. 12I, in the second narrative note, the compound word "man-months" should be --person-months--.

In FIG. 12I, in the third-to-last line of text, the word "Producvity" should be --Productivity--.

In the Specification:

In column 4, line 47, in Table 2, the number and words "1 form points" should be --1 form point--.

In column 8, line 62, the words "one more" should be --one or more--.

In column 10, line 26, the word "accept" should be --to accept--.

In column 10, line 46, the word "accept" should be --to accept--.

In column 10, line 56, the word "accept" should be --to accept--.

In column 11, line 2, the word and punctuation "points)" should be --points).--.

In the Claims:

In column 14, lines 15-16, the words "sizes for the one or more modules is" should be --sizes for the one or more modules are--.

In column 16, line 1, the words "modules points" should be --module points--.